United States Patent
Ascenzi

(10) Patent No.: US 8,345,946 B2
(45) Date of Patent: Jan. 1, 2013

(54) DETERMINING ORIENTATION OF CILIA IN CONNECTIVE TISSUE

(75) Inventor: Maria-Grazia Ascenzi, Santa Monica, CA (US)

(73) Assignee: The Regents of the University of California, Oakland, CA (US)

( * ) Notice: Subject to any disclaimer, the term of this patent is extended or adjusted under 35 U.S.C. 154(b) by 721 days.

(21) Appl. No.: 12/297,052

(22) PCT Filed: Apr. 13, 2007

(86) PCT No.: PCT/US2007/066630
§ 371 (c)(1),
(2), (4) Date: Aug. 3, 2009

(87) PCT Pub. No.: WO2008/105881
PCT Pub. Date: Sep. 4, 2008

(65) Prior Publication Data
US 2009/0310833 A1    Dec. 17, 2009

Related U.S. Application Data

(60) Provisional application No. 60/791,998, filed on Apr. 14, 2006, provisional application No. 60/812,161, filed on Jun. 8, 2006.

(51) Int. Cl.
*G06K 9/00* (2006.01)

(52) U.S. Cl. ........................................ 382/133; 382/128

(58) Field of Classification Search .......... 382/128–131; 378/4–27; 348/79–80; 600/407–481
See application file for complete search history.

(56) References Cited

U.S. PATENT DOCUMENTS

| | | | |
|---|---|---|---|
| 5,807,264 A * | 9/1998 | Paltieli | 600/477 |
| 6,697,508 B2 * | 2/2004 | Nelson | 382/131 |
| 2001/0033679 A1 * | 10/2001 | Hasegawa et al. | 382/128 |
| 2011/0022370 A1 | 1/2011 | Ascenzi | |

OTHER PUBLICATIONS

Tsang et al. "Ciliary central microtubular orientation is of no clinical significance in bronchiectasis." Respiratory Medicine (2005) 99, 290-297.*

Jensen et al. "Ultrastructural, tomographic and confocal imaging of the chondrocyte primary cilium in situ." Cell Biology International 28 (2004) 101-110.*

Schwartz et al. "Analysis and modeling of the primary cilium bending response to fluid shear." American Journal of Physiology. Jan. 1997; 272 (1 Pt 2): F132-F138.*

Sui et al. "Molecular architecture of axonemal microtubule doublets revealed by cryo-electron tomography." Nature. 442 (Jul. 27, 2006) 475-478.*

(Continued)

*Primary Examiner* — Valerie Lubin
*Assistant Examiner* — Anita Molina
(74) *Attorney, Agent, or Firm* — Kilpatrick Townsend & Stockton LLP

(57) ABSTRACT

The present invention provides methods and apparatus for determining an orientation of a cilium relative to a characteristic of the shape of the cell from which the cilium projects. Three-dimensional microscopy data may be used to determine an orientation of a cilium relative to a specified axis, which is determined from a profile for each cell. Such orientation may be used to forecast alter, or otherwise study the growth process of chondrocytes. Results indicate that the shape of chondrocytes, the position of the ciliary basal body, the incidence of cilia, and the orientation of cilium, are not random through the growth plate.

21 Claims, 19 Drawing Sheets

The diagram of the ciliated chondrocyte (a) in 3D within the RS is viewed in 2D (b) in two ways: projected onto the plane $\chi\gamma$ on which the $\Theta$-angle is measured and within the plane $\xi\gamma$ on which the $\varphi$-angle is measured.

OTHER PUBLICATIONS

Frank, J., "Three-Dimensional Imaging Techniques in Electron microscopy," *BioTechniques*, 1989, vol. 7, No. 2, pp. 164-173.

International Search Report mailed on Oct. 3, 2008, for International Application No. PCT/US07/66630 filed on Apr. 13, 2007, 2 pages.

Ascenzi et al., "Analysis of the orientation of primary cilia in growth plate cartilage: a mathematical method based on multiphoton microscopical images," J. Struct Biol., 2007, vol. 158, pp. 293-306.

Ascenzi et al., "Orientation of collagen at the osteocyte lacunae in human secondary osteons," J. Biomech, 2008, vol. 41, pp. 3426-3435.

Buckwalter et al., "Growth-plate-chondrocyte profiles and their orientation," J. Bone Joint Surg., 1985, 67-A, pp. 942-955.

Donnelly et al., "Primary cilia are highly oriented with respect to collagen direction and long axis of extensor tendon," J Orthop Res, 2010, vol. 28, pp. 77-82.

Poole et al., "The differential distribution of acetylated and detyrosinated alpha-tubulin in the microtubular cytoskeleton and primary cilia of hyaline cartilage chondrocytes," J. Anat., 2001, vol. 199, pp. 393-405.

Wilsman et al., "Three dimensional orientation of chondrocytic cilia in adult articular cartilage," Proc. $32^{nd}$ Orthop. Res. Soc., New Orleans, 486, Feb. 1986.

* cited by examiner

*Fig. 5c*

Output: geometry of Cell with Cilium    540

Cell position and eccentricy; Cilium length; Cilium Θ- and φ-angles with respect to Cell; 3D plot of Cell with Cilium model

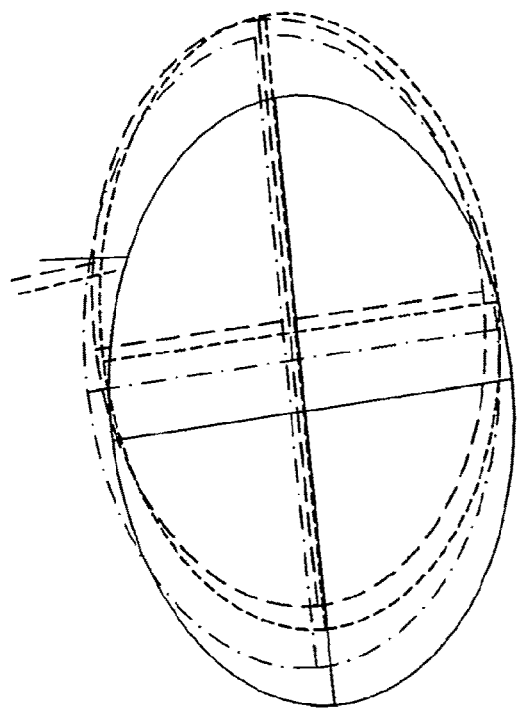
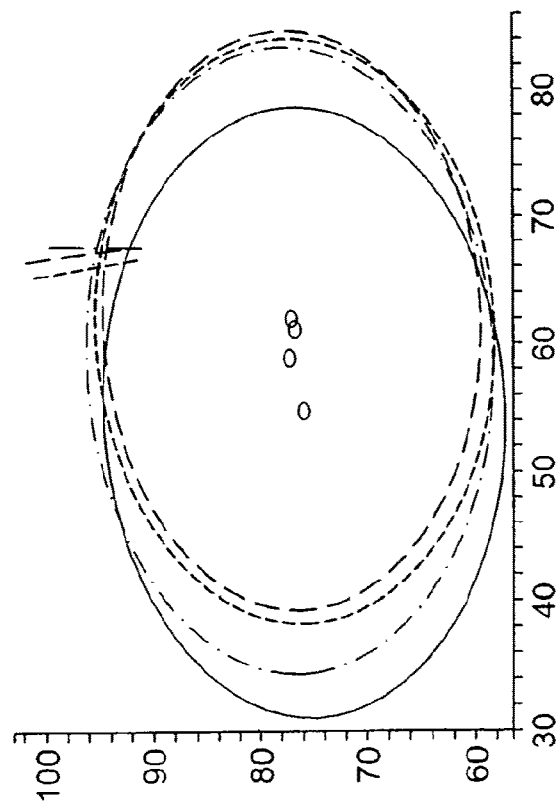
Fig. 8a
Fig. 8b

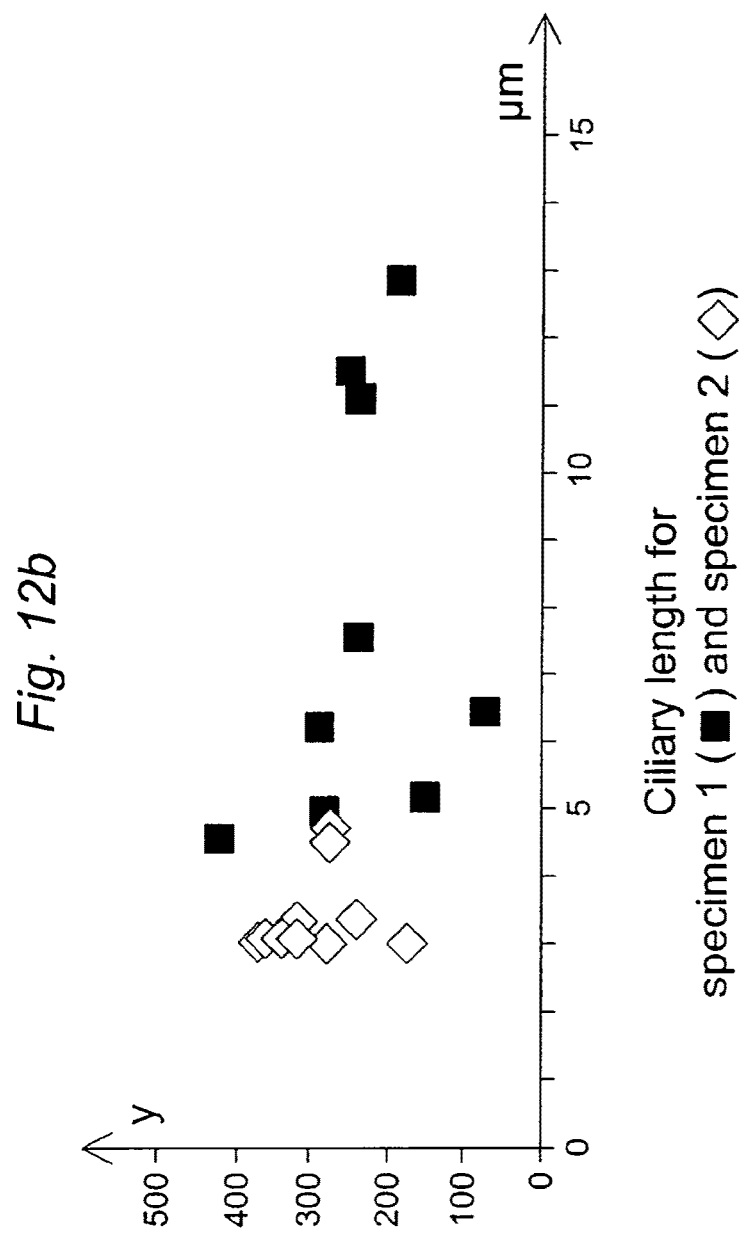

The diagram of the ciliated chondrocyte (a) in 3D within the RS is viewed in 2D (b) in two ways: projected onto the plane $\chi\gamma$ on which the $\Theta$-angle is measured and within the plane $\xi\gamma$ on which the $\varphi$-angle is measured.

Variation of the Θ-angle (marked for the third point at left) along the projection of the cilium on the χγ-plane and of the φ-angle (marked for the first point at right) on the χξ-plane (right).

DETERMINING ORIENTATION OF CILIA IN CONNECTIVE TISSUE

CROSS-REFERENCES TO RELATED APPLICATIONS

The present application claims priority to U.S. Ser. No. 60/791,998, filed Apr. 14, 2006, and U.S. Ser. No. 60/812,161, filed Jun. 8, 2006, each herein incorporated by reference in their entirety.

FIELD OF THE INVENTION

The present invention relates generally to determining an orientation of a cilium of a cell, and more specifically to determining an orientation of a primary cilium of a chondrocytic cell from microscopy images to identify a mechanism for growth of connective tissue.

BACKGROUND OF THE INVENTION

Bone elongation in children occurs through the process of endochondral ossification in cartilaginous growth plates at the ends of long bones. Clonal expansion of stem cells results in columns of chondrocytes whose spatial position within the growth plate mirrors their differentiation stage: cellular proliferation, cellular enlargement (hypertrophy), and cellular apoptotic death followed by replacement of bone on the previously calcified cartilaginous matrix (FIG. 1). The extent of the bone elongation achieved depends on the kinetics of chondrocytic activity at each stage of differentiation, and on the rate of regulated transitions between stages. A complex interplay of genetic and epigenetic factors (e.g. endocrine, paracrine, autocrine, nutritional, biomechanical) influences postnatal longitudinal bone growth by acting primarily at the cellular level through differential effects at specific phases of chondrocytic development and maturation.

The growth plate chondrocytes are anisotropically distributed in the columns that parallel the bone elongation direction, and the columns spatially represent the temporal differentiation cascade of each individual chondrocyte. During this differentiation cascade, chondrocytes complete multiple cellular cycles. Their post-proliferative terminal differentiation is characterized by a significant volume increase during hypertrophy. A critical concept in understanding how longitudinal growth is achieved during the differentiation cascade is that, as cells hypertrophy, they undergo a regulated shape change, and the orientation of the long axis of the cell changes relative to the long axis of the bone.

For example, proliferative cells that had an average height of approximately 10 µm in the direction of growth, become hypertrophic cells with an average height of 25-30 µm in the direction of growth. The sum of each cell's incremental height change multiplied by the number of cells turned over in a day is the single most significant variable accounting for the amount of growth achieved by a given growth plate (Breur et al., 1991; Farnum, 1994; Farnum and Wilsman, 2001 and 2002).

Multiple stereological-based approaches have been used to understand and model this important shape change of growth plate chondrocytes during the differentiation cascade. Chondrocytes can exhibit an elongated shape in certain sections of the tissue. (Buckwalter et al., 1985; Farnum, 1994). Buckwalter et al. (1985) applied methods based on equations involving the intersections of cells with a grid of parallel lines. They quantified the orientation distribution of each cell relative to the other cells in the group and appraised chondrocytic shape in reference to the chondrocytic phase in the growth plate. However, these methods and studies have not provided explanations or mechanisms for anisotropic growth of connective tissue, and in particular have not provided mechanisms that allow for the prediction and possible alteration of growth.

It is therefore desirable for identification of such mechanisms for connective tissue growth, along with methods and apparatus for testing, measuring, and altering such mechanisms.

BRIEF SUMMARY OF THE INVENTION

Embodiments of the present invention provide methods and apparatus for forecasting, altering, and studying the growth process of chondrocytes. Three-dimensional microscopy data is used to determine an orientation of a cilium relative to a specified axis, which is determined from a profile for each cell. Results indicate that the shape of chondrocytes, the position of the ciliary basal body, the incidence of cilia, and the orientation of cilium, are not random through the growth plate.

According to an exemplary embodiment of the present invention, a method and information or computer-readable medium for determining an orientation of a cilium is provided. Three-dimensional imaging data of tissue containing cells and cilia projecting from the cells is received, and a coordinate system is chosen for the imaging data. A three-dimensional spatial profile of a first cell from the imaging data is determined, and an axis of the spatial profile is identified. A line segment corresponding to at least part of a first cilium projecting from the first cell is determined. Two angles defined between the axis of the first cell and the line segment of the first cilium are calculated to determine the orientation. In one embodiment, the axis is a longest segment, or major axis, from one edge of the spatial profile to another edge of the spatial profile.

In an embodiment, the three-dimensional imaging data includes a stack of two-dimensional images taken at varying depths within the tissue. Additionally, cells that appear with a corresponding cilium on at least a predetermined number of consecutive images are marked as visible. The analysis of additional cells visible in the imaging data may be repeated. In one embodiment, the three-dimensional spatial profile is identified by determining two-dimensional profiles, one for each image on which the first cell is visible, and combining the two-dimensional profiles. In another embodiment, two-dimensional axes may be obtained for each image, as well as a line segment of a cilium for that image. One of the two angles may then be calculated by computing a planar angle between the two-dimensional axis and the corresponding two-dimensional line segment and by calculating one of the two angles by taking an average of the planar angles.

In one embodiment, the functional profile is an ellipsoid. The three-dimensional spatial profile may then be determined by measuring a major axis length, a major axis angle, and a minor axis length of an ellipse from each two-dimensional image on which the first cell is visible; calculating an equation of each ellipse using an eccentricity of the ellipse; and determining the ellipsoid from a fit to the ellipses. A second of the two angles may be calculated by identifying a vector that passes through any two subsequent centroids of segments that model the first cilium on respective two-dimensional images; and computing the angle between the vector and an axis of the ellipsoid. In yet another embodiment, the spatial profile is an interpolated spline of a set of pixels defining an outer edge of the cell.

In one embodiment, the line segment corresponding to at least part of the first cilium may be determined by fitting a curve to data points corresponding to the fluorescent detail of the first cilium. The result may then be a continuous spectrum of angles between the curve and the axis. In another embodiment, the coordinate system is rotated to align with a tissue growth orientation.

In one embodiment, more than one cilium per cell may be analyzed. Also more than one cell and corresponding cilia may be analyzed. A variance in at least one of the two angles of the cilia may be plotted to determine a preferred orientation of the cilia. The variance in at least one of the two angles may be plotted versus a direction of growth of the tissue.

Different types of cells may be analyzed, such as osteoblast, chondrocyte of articular, chondrocyte of elastic, osteocyte, odontoblast, ligament fibroblast, meniscal fibroblast, periodontal cell, and adipocyte. In one embodiment, the three-dimensional imaging data is obtained by visualizing the cells using antibodies to acyl-alpha-tubulin, and using multiphoton microscopy for optical sectioning of the sample.

DEFINITIONS

This section provides examples on how some of the terms may be used within this applications.

A "cell" is the structural and functional unit of all living organisms. A living cell can take in nutrients, convert these nutrients into energy, carry out specialized functions, and reproduce as necessary. A living cell may be considered dead when it cannot proceed with some or all of these functions. As used herein, a cell may be either dead or living. "Cilia" are thin, tail-like projections extending outwards from the cell body.

"Imaging data" is any type of data that conveys position and size information of the cells and cilia of a tissue sample. The image data may be in the form of pixels, and may be composed of a stack of two-dimensional images. The spatial information is conveyed through a "coordinate system." A coordinate system has an origin and axes, such as x, y, and z, that define a distance from the origin of a particular part of an object, such as the cell or cilium.

A "spatial profile" is a function or set of points that define a boundary of an object, such as a cell. The spatial profile may just be the boundary or also include the points within the boundary. The spatial profile may be determined from contiguous bright pixels that reveal the presence of a cell. The spatial profile contains or encompasses a majority of the object, and may contain a predetermined percentage of the area or pixels of the cell. An "axis" or chord of the spatial profile, such that an axis has both endpoints on the boundary of the profile. If the profile is an ellipse, one may talk of the major and minor axis.

A "line segment" refers to any curve, linear segment, or linear segment that is used to approximate a position, shape, and/or size of an object, such as a cilium. A line segment may have a width.

An "orientation" of a cilium refers to a three-dimensional (3D) description of a line segment approximating part of the cilium. Two angles define the 3D orientation of any object. The orientation may be with respect to a reference coordinate system or with respect to another object, such as an axis.

BRIEF DESCRIPTION OF THE DRAWINGS

FIGS. 8a-8b illustrate each cellular profile drawn on an image is matched by the plot of the corresponding profile (e.g. ellipse) equations according to an embodiment of the present invention.

FIG. 12B illustrates a variance in the ciliary length according to an embodiment of the present invention.

DETAILED DESCRIPTION

Figure 1:
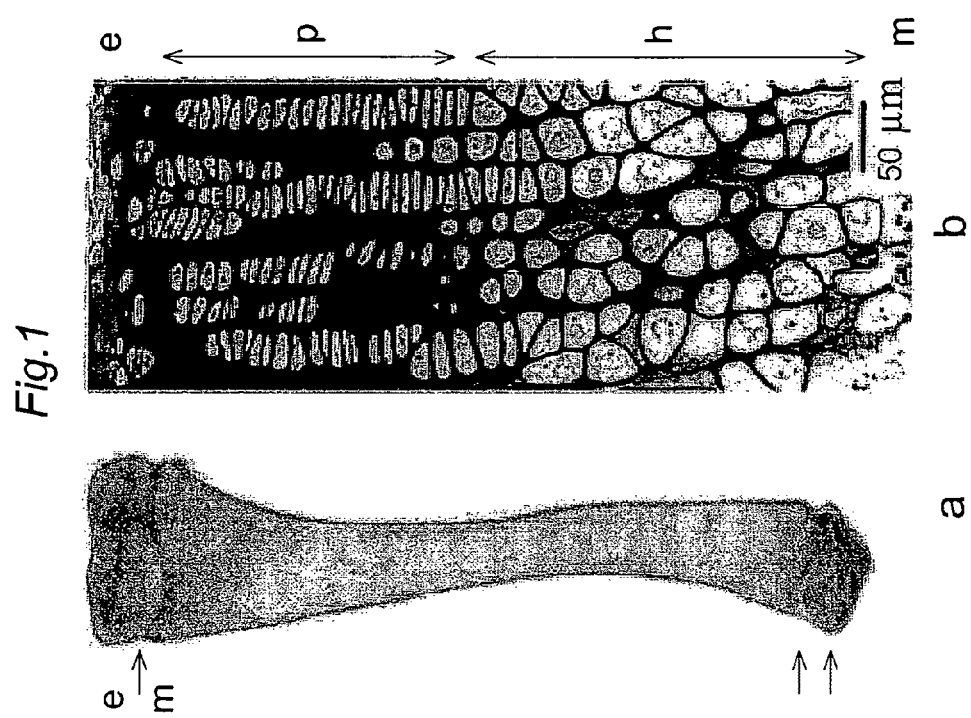
FIGS. 1a-1b respectively illustrate the tibia of a four-week-old rat and growth plates of the tibia via images created according to an embodiment of the present invention.

Embodiments of the present invention hypothesize that an orientation of the primary cilium are involved in the growth process of chondrocytes. Three-dimensional microscopy data is used to determine an orientation of a cilium relative to a specified axis, which is determined from a profile for each cell. Embodiments of the present invention provide results that support the high anisotropy among the distinct zones of the growth plate, which are identified by the organization of chondrocytes in relationship to the long axis of the bone. Additionally, such anisotropy is shown to be well characterized by the orientation of the ciliary axoneme with respect to the orientation of the chondrocyte. Although examples are described in relation to an orientation of a primary cilium determining the growth of connective tissue, an orientation of a cilium may prove useful in many areas. For example, the orientation may determine certain functions and behaviors of many different cells.

I. Introduction (Hypothesis)

Observed originally in rabbit kidney cells (Zimmerman, 1898), the primary cilium has been suggested to constitute a regular structural feature of virtually all eukaryotic cells within both vertebrates and invertebrates, most characteristically at the incidence of one per cell (see http://members.global2000.net/browser/cilialist.html). Based upon analysis of the axonemal structure, primary cilia are considered to be non-motile in the sense that they lack the ability to generate a complex waveform characteristic of motile cilia, such as those found in cells of the airway epithelium. Primary cilia have been observed in the cells of multiple connective tissues including osteoblasts (Tonna and Lampen, 1972), osteocytes (Federman and Nichols, 1974), odontoblasts (Garant et al., 1968), ligament fibroblasts (Bray et al., 2005), meniscal fibroblasts (Le Gaverand et al., 2001), periodontal cells (Beersten et al., 1975), adipocytes (Geerts et al., 1990), and in chondrocytes of articular (Wilsman, 1978) and elastic (Cox and Peacock, 1977) cartilage.

In connective tissues the cilium projects into the extracellular matrix (ECM) and is closely associated with the Golgi apparatus of the cell. Recent papers recognize primary cilia as sensory organelles for detection and transmission of signals from the extracellular environment to the cell, essential for tissue homeostasis, function, and shape (Pazour and Witman, 2003; Whitfield, 2003; Davenport and Yoder, 2005; Schneider et al., 2005; Olsen, 2005; Badano et al., 2005; Poole et al., 1985, 1997, 2001). However, as attractive as these hypotheses are, they are very difficult to test in the living animal.

To fill this void, embodiments of the present invention hypothesize the following. If the primary cilium of connective tissue cells is a sensory organelle involved with receiving biomechanical signals that result in directed secretion of the surrounding ECM, the orientation of the cilium in three dimensional space should be consistent with the orientation of the cell itself (i.e. the long axis of the cell on longitudinal sections), or of the orientation of the cells within the tissue (i.e. the long axis of the macroscopic bone). The growth plate is a particularly appropriate connective tissue to investigate this hypothesis since in growth plate cartilage, cellular profiles and their orientation have been studied using stereologically based approaches, and it is clear that the long axis of the cell relative to the long axis of the bone changes as chondrocytes progress from proliferation through their terminal differentiation characterized by cellular enlargement during hypertrophy (Farnum et al., 1990; Breur et al., 1991; Hunziker et al., 1987; Buckwalter et al., 1986; Hunziker and Schenk, 1989; Wilsman et al., 1993; Cruz-Orive and Hunziker, 1986).

Accordingly, embodiments of the present invention assume that each chondrocyte's primary cilium acts as a mechanosensor, analogously to the primary cilium of epithelial tissue cells. In one aspect, the specific mechanical stimulation during growth is posited to result in directed secretion of extracellular matrix, thereby establishing tissue anisotropy in growth plate cartilage. The chondrocyte's primary cilium would sense such stimulation, and through its specific orientation in three-dimensional space during normal growth, would then transmit to the chondrocyte the tissue-characteristic preferential directional secretion.

Embodiments of the present invention assess the orientation of the primary cilium with respect to its associated chondrocyte, the growth plate, and/or to the direction of bone elongation. In one aspect, three-dimensional cellular orientation is assessed with respect to the growth plate, and the ciliary orientation is assessed with respect to cellular orientation. In one embodiment, imaging data is used from serial optical sections of growth plate chondrocytes captured by multiphoton microscopy, after immunohistochemistry to demonstrate acyl-α-tubulin in the ciliary axoneme. The method is applicable to investigation of ciliary orientation in different zones of the growth plate, under either normal or altered biomechanical environments. The methodology is highly flexible and can be extended to other connective tissues where tissue anisotropy and directed secretion of extracellular matrix components are hypothesized to depend on the tissue's biomechanical environment during development and growth.

II. 3D Modeling

The three dimensional microscopy information may be obtained via any method. Typically microscopes will receive specific signals from objects that have absorbed a luminescent substance, such as fluorescents. However, other methods using purely light or other particles may be used for the imaging. The imaging may be swept in vertical planes or segments, horizontal planes or segments, or in any suitable pattern.

Figure 2:
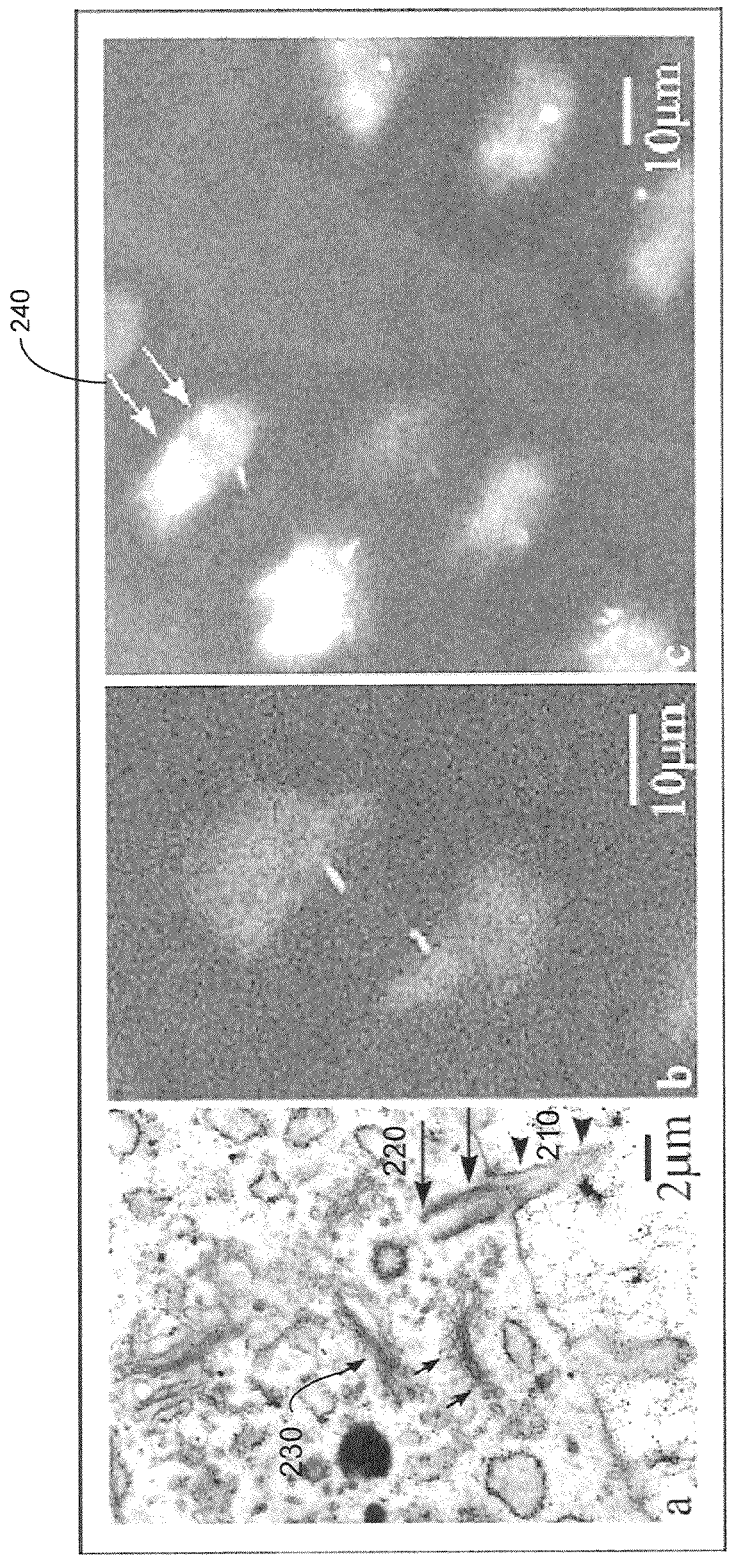
FIGS. 2a-2c illustrate results from imaging the primary cilium in growth plate chondrocytes according to an embodiment of the present invention.

In one embodiment, samples were washed in a fluorescienated material such that cells which absorb the material would react with light. A multiphoton microscope (MPM), confocal microscopy (CM), transmission electron microscopy (TEM), or other suitable microscope, may then be used to image a sample along planes (Z-stacks) of varying depth. One skilled in the art will appreciate that other methods to image a cell may be used. FIGS. 2a-2c illustrate results from imaging the primary cilium in growth plate chondrocytes according to an embodiment of the present invention.

FIG. 2a demonstrates the typical appearance of a primary cilium from growth plate cartilage using transmission electron microscopy. This TEM micrograph of the primary cilium shows a hypertrophic cell in the distal radial growth plate of a four-week-old minipig. The ciliary axoneme, seen here only as an initial grazing section, projects into the surrounding ECM. Short arrowheads 210 indicate the extent of the axonemal profile, which appear as an extension of the more electron dense basal body, which lies within the cellular cytoplasm indicated with long arrows 220. The cilium and its associated centriole (seen here in transverse section) are found in that region of the cytoplasm where Golgi stacks are numerous, indicated by short arrows 230.

FIGS. 2b and 2c show images of the primary cilium of growth plate chondrocytes as visualized by MPM. FIG. 2b shows two chondrocytes with the axonemes of the primary cilia projecting toward each other. The profiles of two early hypertrophic cells by MPM, whose ciliary axoneme of each cell fluoresces green, demonstrate reaction with the acyl-α-tubulin antibody. The curved outline of the cellular profiles is seen, contrasting to the sharply defined straight cilium.

FIG. 2c shows a field of cells and their associated primary cilia at slightly lower magnification. It can be seen that the length of the ciliary profile in any given section is variable, reflecting its orientation into the z-plane. In the three chondrocytes in the column at the right, the cilium appears as a round dot, indicating that its primary orientation is in the z-plane. In cells in columns on the left, a fuller extent of the axonemal length is seen, indicating orientation primarily in the xy-plane. Double arrows 240 on one cellular profile indicate Golgi stacks, which are reactive (stained positively) as well with the acyl-α-tubulin antibody. Because the Golgi stack is positioned entirely in the cells, the Golgi stack is clearly differentiated from the ciliary axoneme of the same cell.

Figure 3:
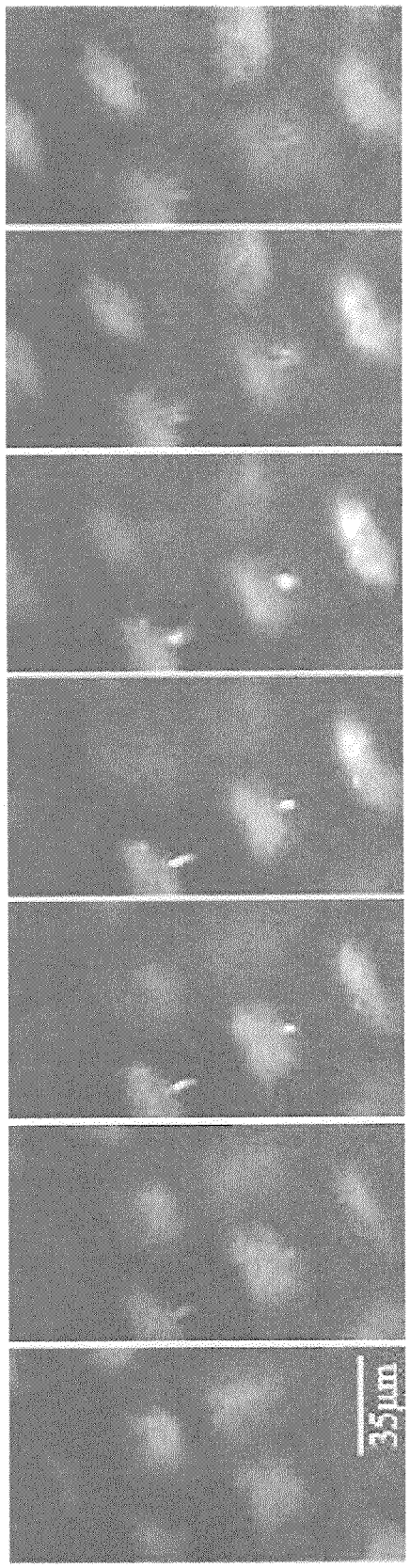
FIG. 3 presents seven frames taken at 2 μm intervals by an MPM and reconstructed as serial sections according to an embodiment of the present invention.

FIG. 3 presents seven frames taken at 2 μm intervals by an MPM and reconstructed as serial sections according to an embodiment of the present invention. In two chondrocytes, the cilium comes prominently into view in the middle three sections and then disappears again. Embodiments of the present invention for assessment of 3D orientation of the cilium use this type of z-stack images as the input for creating the morphometry data and subsequent geometry calculations.

III. Determining Orientation of Cilia

A. Previous Investigations

In the past ten years, there has been a significant increase in understanding the role of the primary cilium as a sensory organelle in epithelial cells throughout the body, with the greatest breakthroughs coming from discovering abnormalities of the primary cilium linked to specific diseases, such as polycystic kidney disease (PKD) in young children (for a recent review, see Pan et al., 2005). Related to the understanding of the mechanisms that link abnormal ciliary function to development of cysts in PKD, analyses of the orientation of the primary cilia as they project into the renal tubule luminal space, and how this orientation is altered in the disease state have been done (Fischer et al., 2006).

In epithelia, the primary cilium of each cell projects into the lumen of the organ or to the surface of a monolayer culture. In this superficial position, its presence and orientation can be analyzed by light microscopical techniques following experimental manipulation. Models have been generated to present diagrammatically the response of primary cilium of renal epithelial cells to the fluid flow. The cilia show passive bending, which then initiates signaling cascades that involve molecules such as Wnt and Hedgehog (Corbit et al., 2005; Germino, 2005; Huangfu et al., 2005; Liu et al., 2005).

Similar modeling of the position of the cilium in three-dimensional space has been generated for monocilia associated in the ventral node of embryos undergoing gastrulation. Monocilia, unlike the primary cilia of epithelia cells, can actively generate motion. Nonetheless, a key to the understanding of their function has been the development of models that allow visual presentation of their tilted position relative to the posterior end of the node as laterality is established (Hirokawa et al., 2006; Nonaka et al., 2005). Such studies describe ciliary dynamics in terms of the two angles that determine the cilium's orientation in a 3D reference system. Equations describe ciliary movement in terms of time (Okada et al., 2005; Nonaka et al., 2005; Tanaka et al., 2005), and faster and slower movements of the cilium are described as a function of the distance from the cell's surface (Buceta et al., 2005).

In contrast to what is understood about orientation of primary cilia in epithelial cells and nodal cells, there is almost nothing except anecdotal information about the orientation for the primary cilium of cells in connective tissues. This is at least partly due to the increased complexity of analyzing the cilium as it projects into the ECM, rather than into the lumen of a tubular organ. Multiple observations of the position of the ciliary axoneme relative to the chondrocytes in articular cartilage in situ have confirmed that its orientation is variable, ranging from paralleling the long axis of the cell, to projecting directly into the ECM, or found invaginated for a significant distance along the cellular plasma membrane (Poole et al., 2001). A TEM study that examined the orientation of the ciliary basal body to the centriole by serial section analysis of equine articular cartilage demonstrated that essentially all cilia project away from the articular surface. No consistency of orientation relative to the alignment of the cell was demonstrated (Wilsman and Farnum, 1986).

Although the studies for epithelial cells and nodal cells, as well as for connective tissue, have studied an orientation of cilia, they have not provided systematic, quantitative, and reproducible methods for measuring a physically relevant orientation of cilium.

B. Present Embodiments

Figure 4:
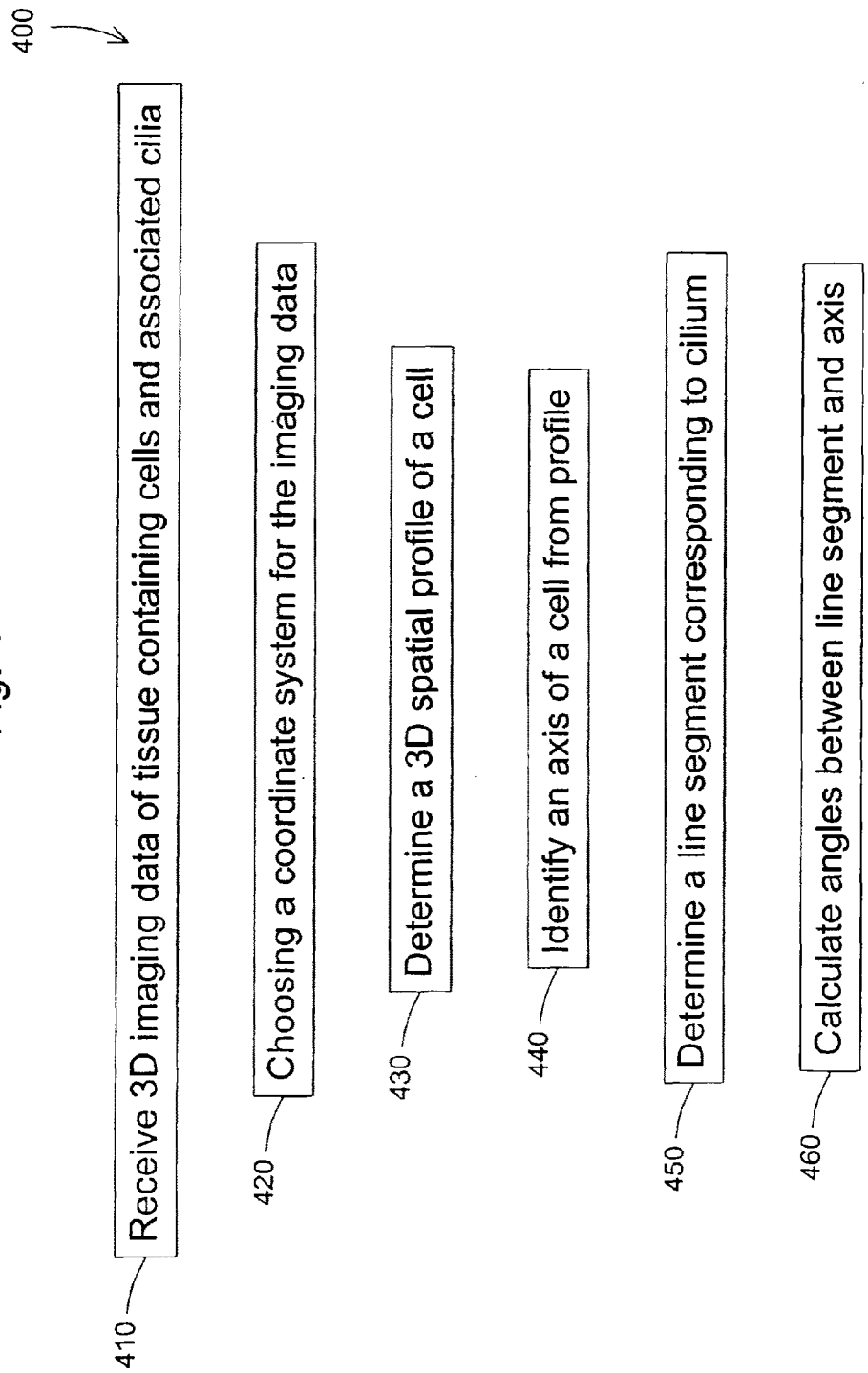
FIG. 4 illustrates a flowchart of a method for determining an orientation of a cilium according to an embodiment of the present invention.

FIG. 4 illustrates a flowchart of a method 400 for determining an orientation of a cilium according to an embodiment of the present invention. In step 410, three-dimensional imaging data of tissue containing a first cell and a first cilium projecting from the first cell are received. In step 420, a coordinate system for the imaging data is chosen. In step 430, a three-dimensional spatial profile of the first cell from the imaging data is determined. The spatial profile provides a size and shape of the cell. Any number of objects may define the spatial profile. For example, single functional objects such as an ellipse or regular polygon may define the outer surface of the cell. The spatial profile may simply be a set of points, which may be then be interpolated to create splines, such as B-splines, for defining an outer edge of the cell.

In step 440, an axis of the first cell from the spatial profile is identified. In one embodiment, the axis is the longest line segment from one point of the profile to another point of the profile, e.g. the long axis of an ellipse. The shortest line segment may also be identified as the short axis, or any other suitable line segment may be identified as an axis. In step 450, a line segment corresponding to at least part of the first cilium is determined from the imaging data. In step 460, two angles defined between the axis of the first cell and the line segment of the first cilium are calculated. The calculation of the orientation may be performed for other cells of the tissue and the results analyzed together. A fuller description of one embodiment is described below.

Figure 5A:
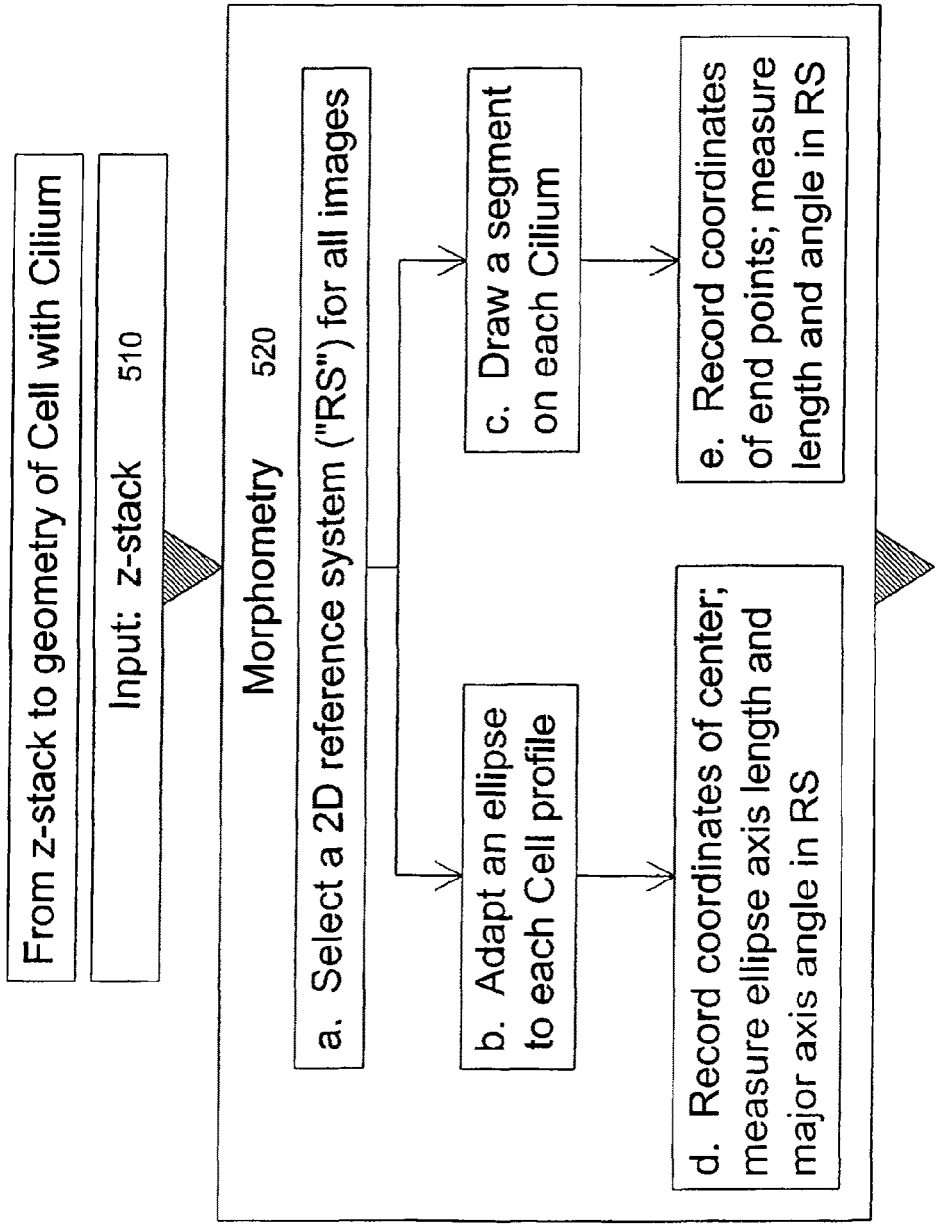
FIG. 5 illustrates a flowchart of a method for determining an orientation of a cilium according to an embodiment of the present invention.
Figure 5B:
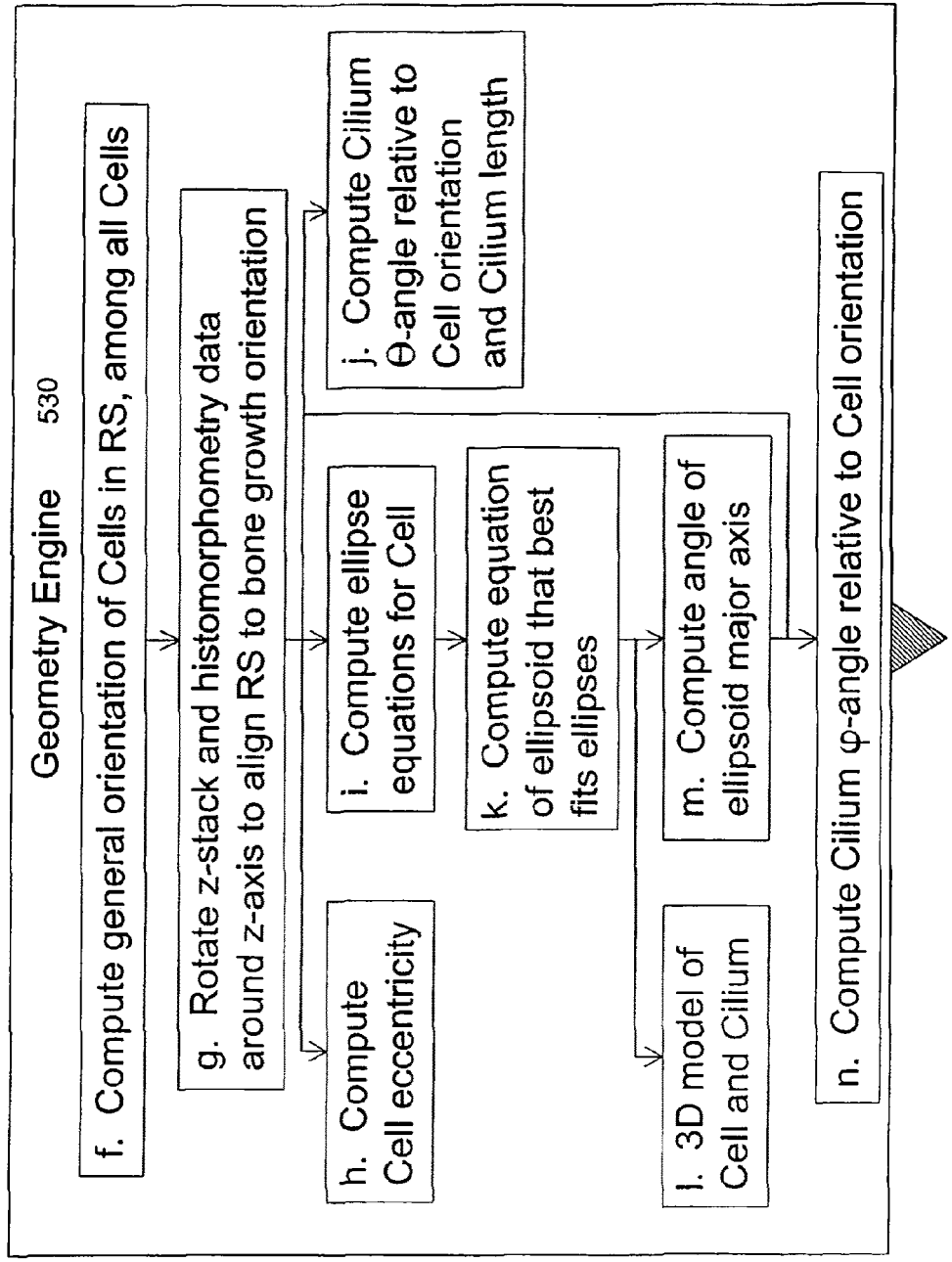

FIG. 5 illustrates a flowchart of a method 500 for determining an orientation of a cilium according to an embodiment of the present invention. Method 500 is depicted with 4 main sections: input 510, a morphometry module 520, a geometry engine 530, and an output 540. One skilled in the art will appreciate that any of the steps of method 500 may implemented in a number of different ways, and that certain steps are optional.

1. Input

In the input 510, a set (z-stack) of two-dimensional (2D) images is received. In one embodiment, the z-stacks refer to a 328.7×438.3×79.5 μm specimen at 309× magnification. Each stack consisted of 40 to 60 tiff images obtained with a plane of focus of thickness either 1 μm or 1.5 μm and a gap between adjacent images of 0.5 μm. Each of the tiff images may be imported into visualization software, such as XaraX1.

2. Morphometry

Figure 6:
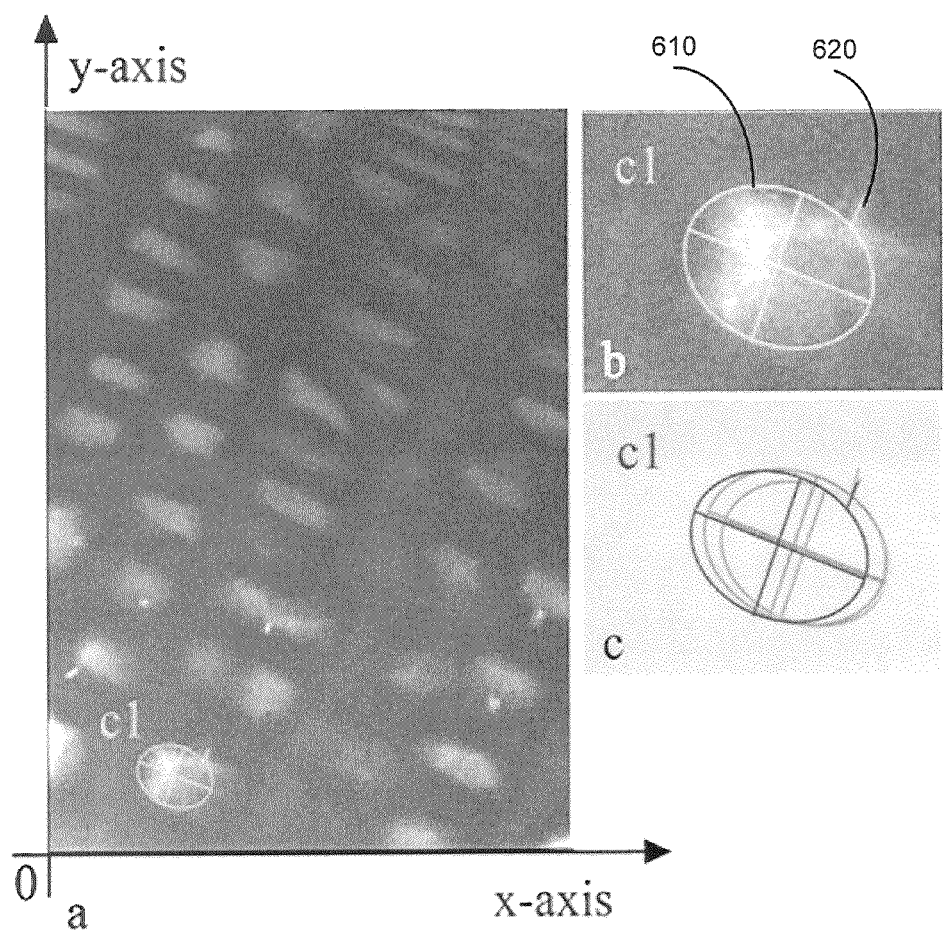
FIG. 6a illustrates an image with a coordinate system chosen according to an embodiment of the present invention.
FIG. 6b shows an ellipse and segment for cell #1 on the first scan on which the cellular optical section is visible according to an embodiment of the present invention.
FIG. 6c shows ellipses and segments relative to four images on which cell #1 and its cilium appeared according to an embodiment of the present invention.

In morphometry module 520, data regarding the positions, shape, or other geometries of the sample tissue and of cells within the sample are created. In step a, a reference (coordinate) system is chosen for each image. FIG. 6*a* illustrates an image with a coordinate system chosen according to an embodiment of the present invention. The origin of an x,y- coordinate system is placed at the bottom left corner of each image with the x-axis parallel to the specimen width and the y-axis parallel to the specimen length for each image of the stack. Naturally, the opposite choice could be made as well. The z-axis was chosen to parallel the direction of the specimen thickness. In one embodiment, the origin of the z-axis is placed at a level corresponding to the bottom surface of the original specimen. In one aspect, the direction of the z-axis is determined by the right-hand rule, that is it is opposite to the increasing scan number. In other embodiments, the origin may be placed at other corners of the images, within the image, or even off of the image. The axes may be non-orthogonal and not follow the right hand rule.

Each image is analyzed to identify the cells and the corresponding cilia. The images may be scanned from top to bottom and from left to right, vice versa, or in any suitable order. In one embodiment, the cells that appeared with their cilium on at least a predetermined number, e.g. 3, of consecutive images were marked as visible and kept for further analysis. In FIG. 6a, cell c1 is one such cell.

In step b, a two dimensional profile for each visible cell is created. In one embodiment, an ellipse is adapted to each optical section of each visible cell on each image, and the major and minor axis of each ellipse are marked. The ellipse may be determined from certain criteria, such as encompassing all or a specified percentage of visible points (e.g. points with a luminosity above a certain value) of the cell. Further, the ellipse with the smallest area that still satisfies the above restriction may be chosen.

In step c, respective line segments are each overlapped with each visible fluorescent detail that was interpreted as a cilium. An overlapping line segment may cover all of this fluorescent detail or only parts. Equivalently, the line segment may also be parallel to the cilium. In one embodiment, the segment is traced from the edge (circumference) of the spatial profile (e.g. an ellipse) to an end point of the fluorescent detail. In another embodiment, a continuous or piecewise linear segment may be determined that approximates the fluorescent detail, which may be done by a fitting algorithm as would be known to those skilled in the art.

Figure 6C:
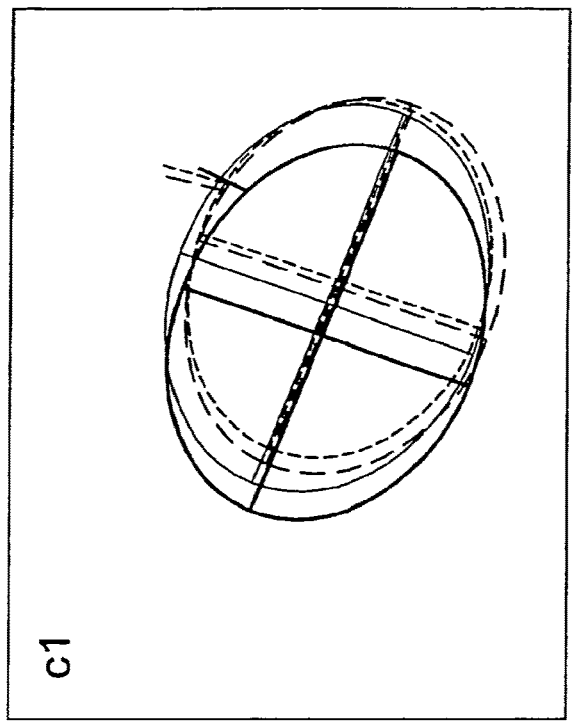
Figure 6B:
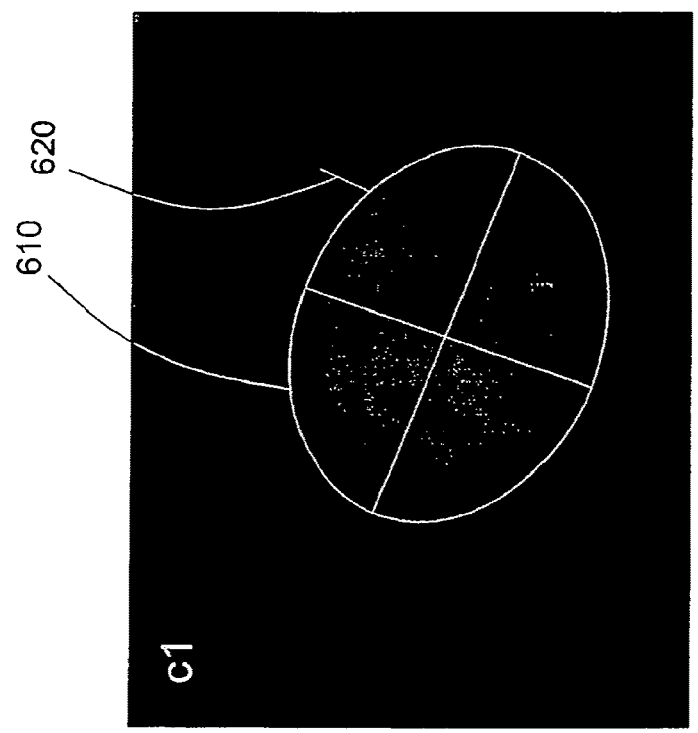

FIG. 6b shows an ellipse 610 and segment 620 for cell #1 on the first scan on which the cellular optical section is visible according to an embodiment of the present invention. In one embodiment, consistently through the images on which a cell and its cilium appear, the colors red, orange, yellow, green, blue, navy, and violet are employed consecutively. FIG. 6c shows ellipses and segments relative to four images on which cell #1 and its cilium appeared according to an embodiment of the present invention.

In one embodiment, the XaraX1 file was calibrated in terms of microscopical magnification in order to measure details of each image in real microns. Angles may be measured in degrees with respect to the horizontal x-axis. The first and last scan numbers on which the cell appeared with or without its cilium are recorded. In step d, on each image on which the cell appeared with its cilium, the x and y coordinates of the profile (e.g. ellipse) center are recorded, and the major axis length, the major axis angle and the minor axis length are measured. In step e, the line segment length and angle are measured in the chosen reference system. The x and y coordinates of the initial and final points of segment are recorded. Table II below reports the data for cell #1.

3. Geometry Analysis

In the geometry engine 530, the morphometry data is processed to calculate the geometry of the cells and an orientation of the primary cilia. In one embodiment, geometry engine 530 is written in Maple, although any language may be used.

Figure 7:
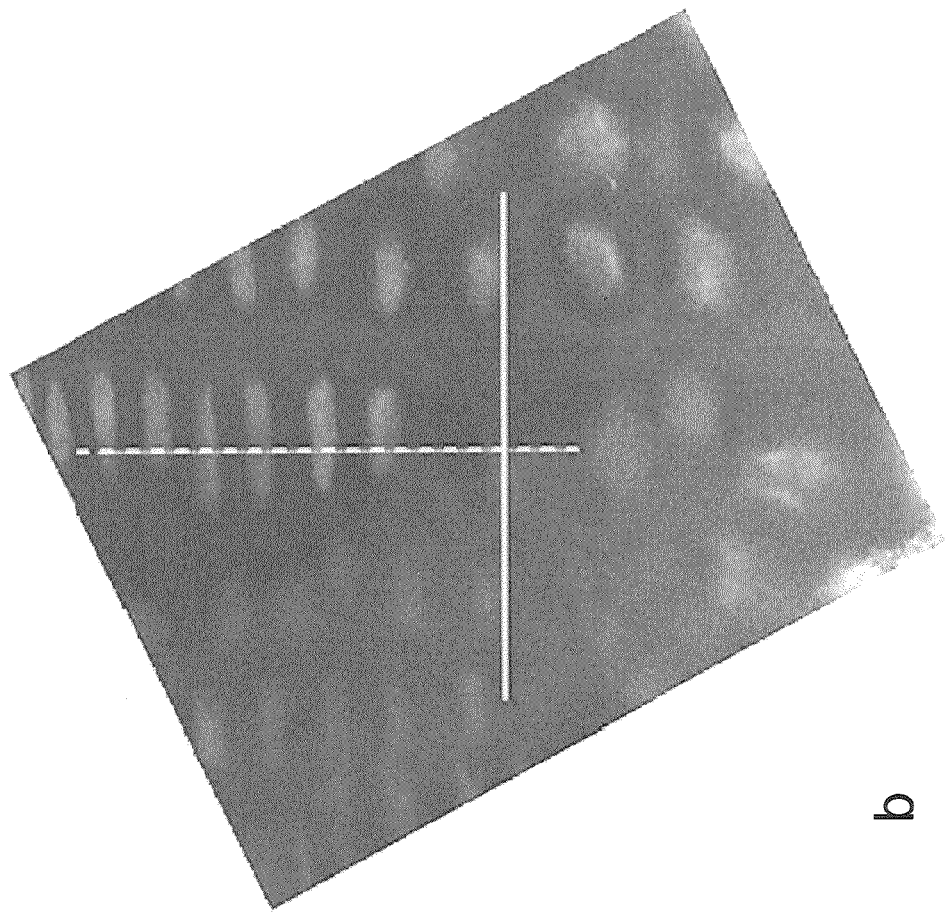
FIGS. 7a-7b illustrate the general orientation of the cells of an image and a rotation of that orientation according to an embodiment of the present invention.
Figure 7:
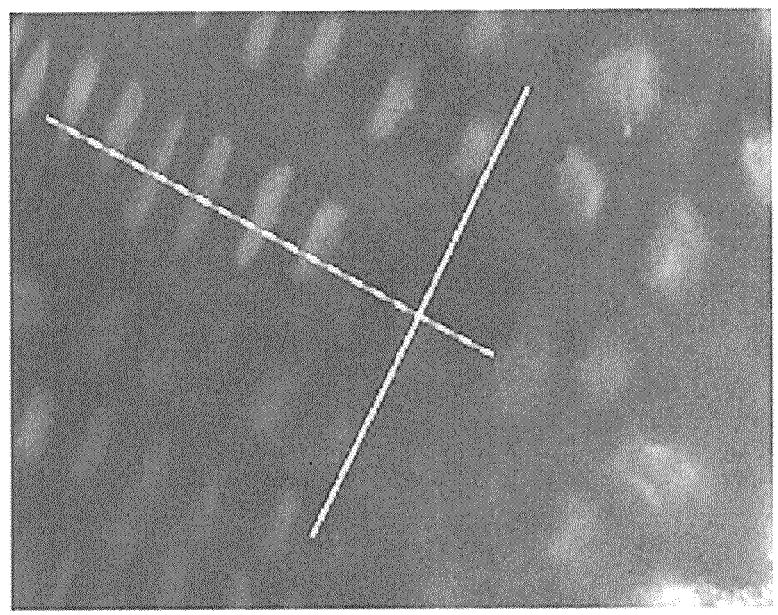

In step f, the general orientation of cells of one or more 2D images is computed as the average angle of an axis of the ellipses, e.g. the axis whose orientation is closer to the x-axis orientation. FIGS. 7a-7b illustrate the general orientation of the cells of an image and a rotation of that orientation according to an embodiment of the present invention. In one aspect, the orientation of cellular columns is measured as 180 degrees minus the general orientation (average angle) of cells. In FIG. 7a, the value was 24.65 degrees. The average angle for each image may be combined into an overall average for the z-stack.

In step g, the images of the z-stack and all morphometry data are rotated by 180 degrees minus the angle that measured the general orientation of cells. Each image may be rotated by its respective general orientation, by the orientation from a sample image, or by the overall orientation of the z-stack. FIG. 7b illustrates an image after rotation such that the image displays cells, cilia and their adapted ellipses and segments according to the orientation of the original specimen before isolation from tibia. Hence, the new y-axis parameterized the longitudinal position along the direction of bone elongation. In particular, the new y-coordinate of the center of each cell parameterized the level of the cell within the differentiation cascade from proliferative to hypertrophic. Hence, the y-axis represents the direction of growth. In one embodiment, the y-value measures the position of the cell within the specimen and is called the "position" parameter.

In step h, the eccentricity of each ellipse was computed by means of the formula $1-(b/a)2$, where a is the major axis and b is the minor axis of the ellipse. The eccentricity parameter varied therefore between 0 and 1. It equals zero when b equals a, that is when the ellipse is a circle. As the ellipse moves away from the circular shape and becomes flatter, a assumes values increasingly larger with respect to the value of b, the fraction b/a decreases towards the 0 value, and the eccentricity value approaches 1.

In step i, equations of ellipses were computed from the data collected. Thus, the position of each profile is defined. This may be similarly done for other functional types for the profiles. FIGS. 8a-8b illustrate each cellular profile drawn on an image (FIG. 8a) is matched by the plot (FIG. 8b) of the corresponding ellipse equations according to an embodiment of the present invention. For example, the red ellipses is the plot of $x=-23.80\cos(th)+1.23\sin(th)+54.67, y=-1.57\cos(th)-18.56\sin(th)+76.03, z=70.75$, for $0 \leq th \leq 2\pi$. The graphs matched well the elliptical cellular profiles which were originally drawn on the microscopical images shown in FIG. 8b. Further, the segment that models the cilium was plotted with the respective cell in order to model the cilium optical section together with the section of the cell.

Figure 9:
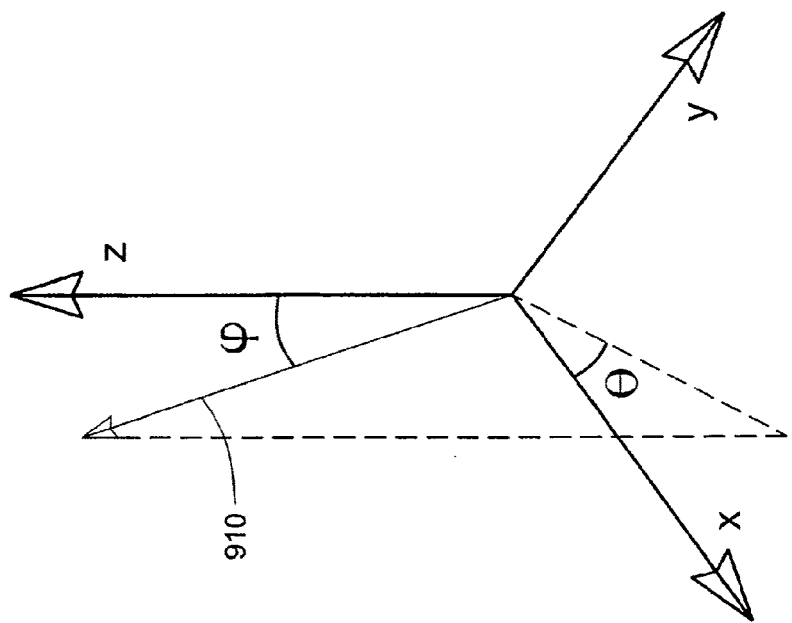
FIG. 9 illustrates that the orientation of any chosen segment in 3D is characterized by two independent angles, $\theta$ and $\phi$.
Figure 10:
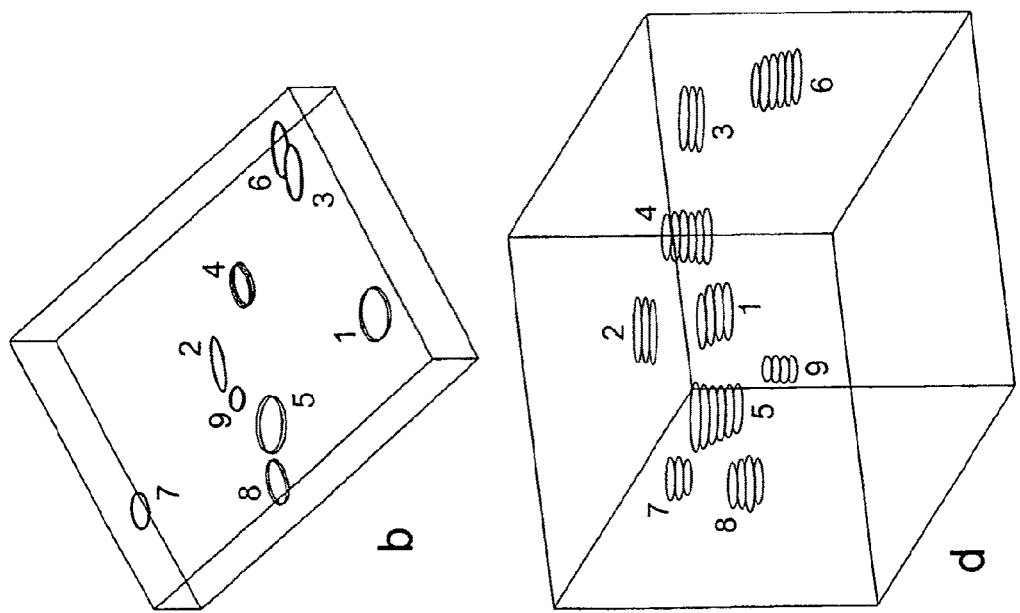
FIGS. 10a-10d illustrate an example of a set of ellipses relative to any given cell according to an embodiment of the present invention.
Figure 10:
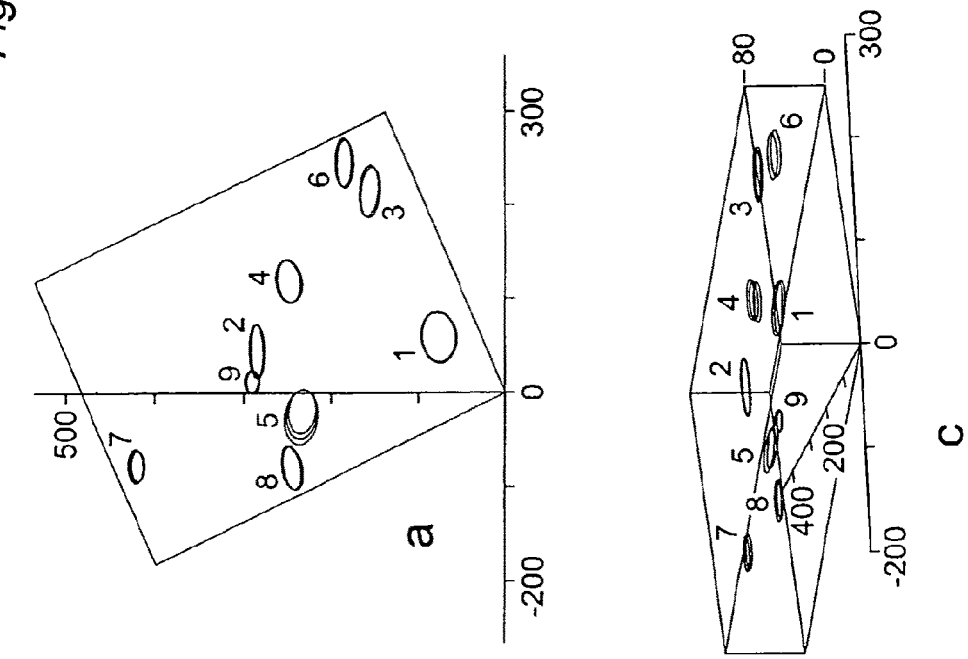

FIG. 9 illustrates that the orientation of any chosen segment in 3D is characterized by two independent angles, $\theta$ and $\phi$. For a segment 910, the Euleurian angles $\theta$ and $\phi$ are marked with respect to the xyz-reference system. Usually, $0 \leq \theta \leq 2\pi$ and $0 \leq \phi \leq \pi$. Here $0 \leq \phi \leq 2\pi$ was chosen to assess orientation along which the cilium is pointing away from the cell within the four quadrants. Because the orientation of any chosen segment in 3D is characterized by two independent angles, $\theta$ and $\phi$, these two angles were computed for all meaningful segments.

In step j, the $\theta$ angle is calculated. In one embodiment, for each image on which a given cell appeared, the angle was computed between the segment that models the cilium and the major axis of the ellipse that models the cellular optical section. This may be done by combining reference angles of the segment and the major axis with respect to an axis, e.g. the x-axis. Note that another axis of the profile, such as the minor axis, could be used as well. The average of such angles for a given cell is referred to as the θ-angle of the cilium. The length of the cilium may also computed. In one embodiment, the length of the cilium is computed as the distance between the first and the last centroid of segments that model the cilium on the images on which the cilium appeared. The length may also be determined from a 3D fitting of the fluorescent detail associated with the cilium.

FIGS. 10a-10d illustrate an example of a set of ellipses relative to any given cell according to an embodiment of the present invention. The ellipses are depicted inside a green box whose dimensions are proportionate to the dimensions of the original specimen. As one can see, the ellipses define a 3D object, e.g. an ellipsoid.

In step k, the equation of the ellipsoid was computed, e.g. as the ellipsoid that best fits the ellipses. For each cell, the ellipsoid is constrained to the space between the first and the last scan on which the cell appeared. Further, the z-coordinate of the ellipsoid's center was chosen half-way between the middle of the first plane of focus and the middle of the last plane of focus on which the cell profile appeared. Because the ellipses' centers are not perfectly linearly aligned, a line may be fitted to the ellipses' centers to provide the orientation of the ellipsoid with respect to the z-axis. Note that this is just an example of creating the three-dimensional profile for a specific function, an ellipse.

In step l, the ellipsoid is used to represent the 3D model of the cell. In one embodiment, the 3D reconstruction of a given cilium is obtained by interpolating with segments the set of centroids of each of the segments that modeled the ciliary images.

Figure 11A:
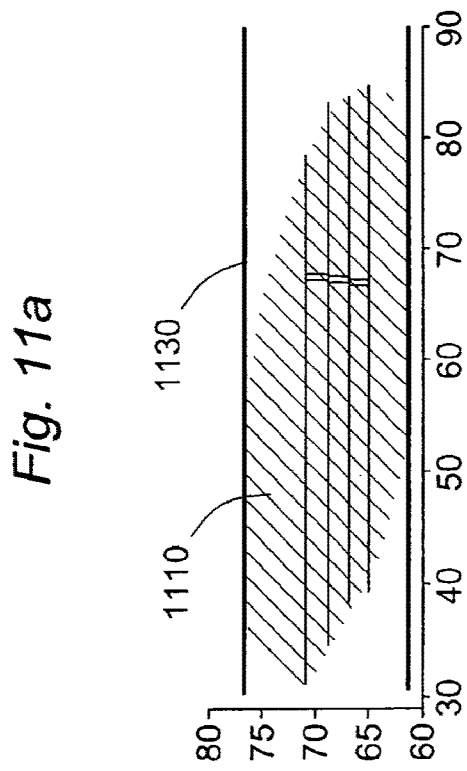
FIGS. 11a and 11b illustrate the 3D model of a cell with its cilium as viewed from two different angles according to an embodiment of the present invention.
Figure 11B:
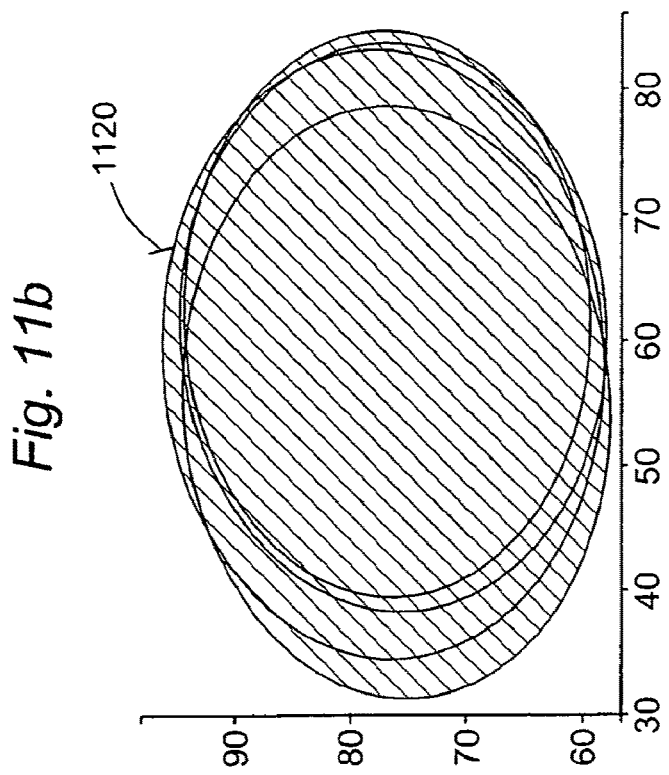

FIGS. 11a and 11b illustrate the 3D model of a cell with its cilium 1120 as viewed from two different angles according to an embodiment of the present invention. The ellipsoid 1110 is the plot of the equations x=26.61 cos(θ)sin(φ)+1.26 sin(θ)sin(φ)−1.19 cos(φ)+57.67, y=1.76 cos(θ)sin(φ)−19.06 sin(θ)sin(φ)−0.08 cos(φ)+77.03, z=−4.22 cos(θ)sin(φ)+7.55 cos(ph)+68.55, for $0 \leq \theta \leq 2\pi$, $0 \leq \phi \leq \pi$. The lines 1130 are indicative of the middle plane of the first and the last scans on which the cell appeared without cilium. The projection of the ellipsoid 1110 on the x,y-plane in FIG. 11b matches the 2D ellipses in FIGS. 8a and 8b.

In step m, the angle of the ellipsoid major axis with respect to the z-axis was computed. Also, in one embodiment, the orientation of the cilium within the chosen 3D reference system was described in terms of a vector that passes through any two subsequent points that were computed as centroids of segments that model the cilium on all the images on which the cilium appeared. In other embodiments, a vector resulting from a linear fit of the centroids or of other points of the segments that model the cilium may be used.

In step n, the φ-angle between the segment that modeled the cilium and the cellular axis is calculated. In one embodiment, this is done by computing the angle between the z-axis and segment that modeled the cilium. Then, this angle and the angle of the ellipsoid major axis with respect to the z-axis are combined (added or subtracted) to obtain the angle between the segment that modeled the cilium and the cellular axis. In one embodiment, a similar procedure with the x or y axis may be performed to obtain the θ-angle in step j.

4. Output

In output 540, for each cell, the cellular longitudinal position, the cellular eccentricity, the cilium length and the cilium angles θ and φ with respect to cell orientation are shown in Table II. Consistency of the output parameters across different samples have been found. For example, an embodiment of the method was developed on a stack of images relative to a growth plate specimen from one rat and tested on a second growth plate specimen from a second rat. When two individuals collected morphometry data from the same cells, no differences in value of the final output parameters were found.

As described above for one embodiment, the angles that the cilium forms with respect to the cellular axis were computed in terms of the orientation of a vector that passes through the points of any two subsequent centroids of segments that model the ciliary 2D images. Thus, in this embodiment, different discrete values of the angle may be calculated for each set of subsequent centroids. However, in another embodiment, the 3D reconstruction of the cilium can approximate the cilium as a curve. For example, the modeling can be improved by employing B-splines to interpolate the centroids by a smooth curve and compute the tangent lines to such curve. Thus, in this embodiment, a continuous description of the cilium's angle along the length of cilium may be obtained.

Also, the collection of the morphometry data was restricted to the images of cells that appear with their cilium, among the cells that appear in the z-stack with their cilium on at least three scans. The data collection was limited to images of cells that appear with their cilium to keep a balance between collection time and accuracy. Collection of data relative to two scans only per cell may extend the algorithm's application to most cells in the imaged specimen.

Embodiments of the present invention provide a rapid means of achieving a quantitative assessment of the three-dimensional spatial orientation of the primary cilium of cells in connective tissues where cellular and matrix organization are highly anisotropic. This methodology may allow exploration of additional topics such as the percentage of the cells that have a cilium in an actively dividing population, and whether, after division, there is a change in the position of the cellular axis with respect to the longitudinal axis of the bone or with respect to the cilium. This ciliary θφ-algorithm provides an important analytical methodology for studying the primary cilium in development, growth and homeostasis of the body's skeletal framework.

EXAMPLES

The following examples are offered to illustrate, but not to limit the claimed invention.

I. Preparation of Samples and Description of Exemplary Imaging Methods

A. Immunocytochemistry

The methodology of Ward et al. (2003) and Chi et al. (2004) was modified for immunocytochemistry of acyl-α-tubulin, whose cellular localization is thought to be restricted to the primary cilium and possibly the Golgi apparatus (Piperno and Fuller, 1985). Male Wistar rats three to four weeks of age were used for this study. The animals were kept under routine housing conditions, and all procedures were approved by the Institutional Animal Care Committee. For each collection, the rat was euthanized with an overdose of pentobarbital delivered by intraperitoneal injection. The hindlimb was disarticulated at the coxofemoral joint and all muscle rapidly removed. The distal limb was isolated by disarticulation at the femoro-tibial joint; the proximal half of the tibia was isolated and immediately placed in 4° C. methanol. All remaining steps to isolate growth plate slabs were performed in 4° C. methanol.

To isolate thin sections of the proximal tibial growth plate, the tibial section was cut sagittally, bisecting it in the anterior-posterior plane. Each half was then placed on its cut side, and further cut into 0.5-1.0 mm thick pieces, including all tissue from the articular surface to the metaphyseal bone. For some sections, the epiphyseal and metaphyseal bone areas were removed essentially in their entirety, leaving slices of full thickness proximal tibial growth plate; for others, approximately 1 mm of metaphyseal bone and all of the epiphysis including the articular cartilage were left intact. Fixation continued in cold methanol for three hours.

The sections were washed four times in 0.1M phosphate buffered saline (PBS) at 25° C. Incubation with the primary antibody (monoclonal anti-acetylated-□-tubulin, Sigma, St. Louis, Mo., T6793) was at 1:100, first for two hours at 25° C., and then overnight at 4° C. Following four washes in PBS, incubation with the fluoresceinated secondary antibody (goat anti-mouse IgG (H+L), Molecular Probes, Eugene, Oreg.) was at 1:100, again for two hours at 25° C., and then overnight at 4° C. Four rinses in PBS were made and the growth plate pieces were stored at 4° C. in PBS before imaging.

FIG. 1 illustrates the following: (a) The proximal (single arrow) and distal (double arrow) growth plates of the tibia of a four-week-old rat are cartilaginous discs, each located between the epiphyseal bone ("e"), and the metaphyseal bone ("m"), at each end of the tibia. (b) This microradiograph shows bone elongation which occurs during the differentiation cascade of chondrocytes in the proximal tibial growth plate of a four-week-old rat. This 1 μm-thick section was stained with methylene blue/azure II to demonstrate the morphology of cells and matrix. The anisotropic arrangement of chondrocytes is demonstrated by the columns of cells, which are a spatial representation of the temporal differentiation of individual chondrocytes. Cellular division is restricted to the proliferative zone ("p"); terminal differentiation is characterized by a significant increase in cellular volume, together with a shape change in the hypertrophic zone ("h"). The death of the terminal chondrocyte occurs just above the metaphyseal bone ("m").

B. Multiphoton Microscopy

The multiphoton microscope (MPM) used has been described in detail previously, including all settings for detection of fluoresceinated probes (Kloppenburg et al., 2000; Zipfel et al., 2003a and 2003b; Farnum et al., 2006). Relative to confocal microscopy, second harmonic generation of collagen under MPM improves visualization of the cell within the matrix (Williams et al. 2005). Growth plate specimens were placed in a concave well on a glass slide and mounted in Vectastain (Vector labs, Burlingame, Calif.) for imaging. A Zeiss 20X/0.75NA dry objective was used. After initial scanning for orientation, z-series were imaged through either 1.5 or 2 μm focal planes for depths as great as 200 μm. Given that the maximal diameter of a chondrocyte in the z-direction measures approximately 20 μm, up to ten consecutive columns of chondrocytes could be analyzed through the depth of the slab of cartilage. This stack of images was the source of cellular and ciliary profile images used to develop the mathematical model.

An advantage of the sequential images captured by MPM through multiple parallel optical planes in the current study is the elimination of any three-dimensional shape assumption to construct three-dimensional shape from a two-dimensional image. The eccentricity parameter that we utilized measured the deviation of the cellular profile, modeled as an ellipse, from a circle with respect to the long axis of the bone. Proliferative zone cells had the most eccentric profiles and the highest degrees of orientation. Cells of the lower hypertrophic zone had the least eccentric profiles and the lowest degree of orientation.

C. Image Analysis

The vector graphic editor XaraX1 software (XaraX Co, London) allowed measurements of details of cells and cilia from each image of each z-stack. Maple software (Waterloo, Inc.) was programmed to correct the small tilt of the specimen under MPN when the z-stack was recorded. The rotation by the appropriate small angle was applied to re-establish the orientation of the chondrocytic columns within the bone in vivo prior to isolation. Algorithms were developed to process the data to yield ciliary orientation in three dimensional space with respect to chondrocytic orientation, expressed through tables of calculated entities and graphs. The methodology developed is applicable to achieve 3D reconstruction from z-stacks obtained by any microscopical modality (confocal microscopy, transmission electron microscopy) in addition to MPM. Details of strategies for development of this approach are presented in the Results section.

D. Transmission Electron Microscopy

The image by transmission electron microscopy (TEM) presented in this paper refers to observations made in a previous study of the distal radial growth plate of four-week-old minipigs (Farnum and Wilsman, 1987). Briefly, growth plates were rapidly collected following euthanasia by pentobarbital overdose. Trimming to slabs to approximately 1 mm×1 mm×3 mm was done in the primary fixative of 2% glutaraldehyde/2% paraformaldehyde in 0.1M cacodylate buffer with 0.7% ruthenium hexamine trichloride (RHT). RHT has been shown to optimally preserve the ultrastructure of growth plate chondrocytes by stabilizing the interface between the chondrocytic plasma membrane and the surrounding pericellular matrix (Hunziker et al., 1983). Primary fixation continued for two hours and was followed by two hours of secondary fixation in 1% osmium tetroxide in 0.1M cacodylate buffer, also containing 0.7% RHT. For some collections potassium ferrocyanide was included in both the primary and secondary fixatives, also to enhance preservation of the interface of the plasma membrane and the ECM (Farnum and Wilsman, 1983). Processing included rapid dehydration in graded alcohols through propylene oxide, followed by infiltration and embedment in epon-araldite. Blocks were polymerized at 60° C. for three days. No decalcification procedures were used. Sections approximately 60 nm thick were collected on 1 mm and 2 mm formvar-coated grids, stained with uranyl acetate-lead citrate, and viewed on a Philips 410 electron microscope at 60 kV.

II. Preliminary Data on Ciliary Orientation

The data presented here show that ciliary orientation, length and curvature are not random in the growth plate and indicate the merit of investigating the orientation and related localization, length and curvature of the primary cilium.

The z-stacks of images obtained by MPM on the proximal tibial growth plates of two male WT rats, aged 3-4 weeks, were analyzed with the above-mentioned ciliary θφ-algorithm. The reference system (RS) was chosen as an xy-plane where x is the medial-lateral axis; y is the tibial axis; and z is the anterior-posterior axis. We chose the major axis of the ellipse fitted to the 2D profile of the chondrocyte on a given image of the z-stack as AR for assessment of axonemal orientation. Our data and other authors' data (McGlashan et al., 2006) show chondrocytes in the proliferative zone with cilium.

Our data relative to 23 chondrocytes from two animals indicate that the shape of chondrocytes, the position of the ciliary basal body, the incidence of cilia, and the orientation of cilium, are not random through the growth plate.

Figure 12A:
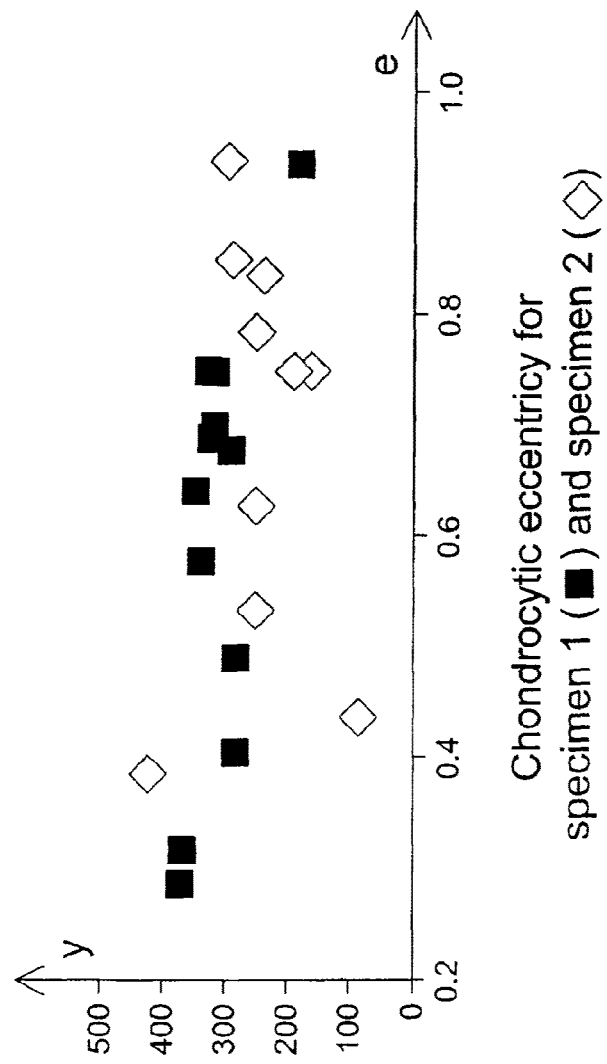
FIG. 12A illustrates a variance of the elliptical eccentricity of the chondrocyte within the morphological zones according to an embodiment of the present invention.

FIG. 12A illustrates a variance of the elliptical eccentricity of the chondrocyte within the morphological zones according to an embodiment of the present invention. These results confirm previous results (see e.g. Buckwalter et al., 1985). This chondrocytic eccentricity will aid in the differentiation of the growth plate's zones in Aim I. The axoneme is positioned at a basal-apical cellular location for 22 out of 23 chondrocytes analyzed. FIG. 12B illustrates a variance in the ciliary length from a minimum of 3.03 µm to a maximum of 13.82 µm within the two tested animals according to an embodiment of the present invention.

Figure 12C:
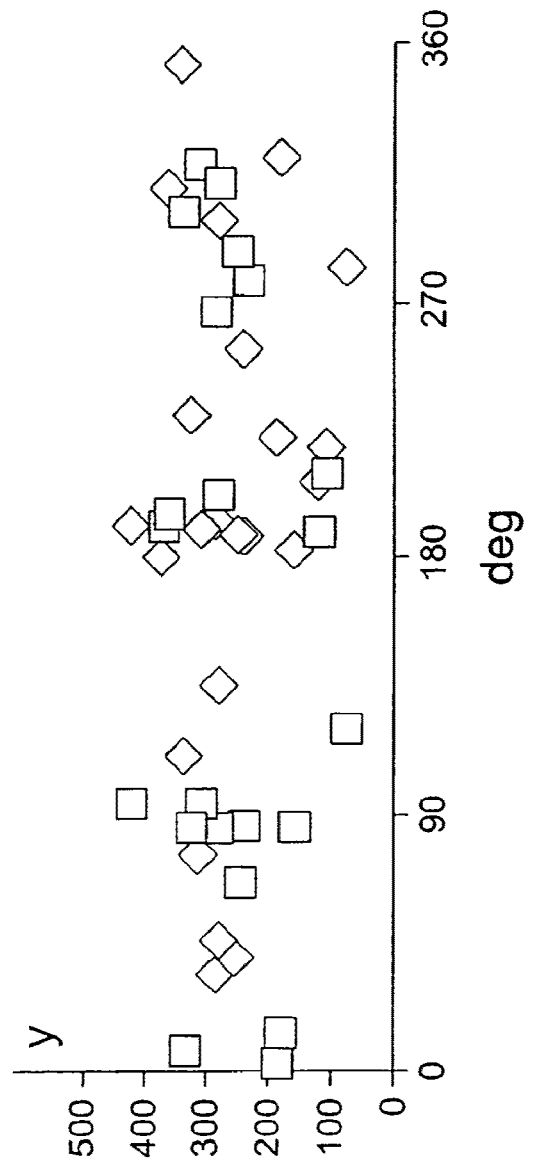
FIG. 12C illustrates a variance of the orientation of the cilium with respect to the major axis of the chondrocyte in 3D according to an embodiment of the present invention.
Figure 13:
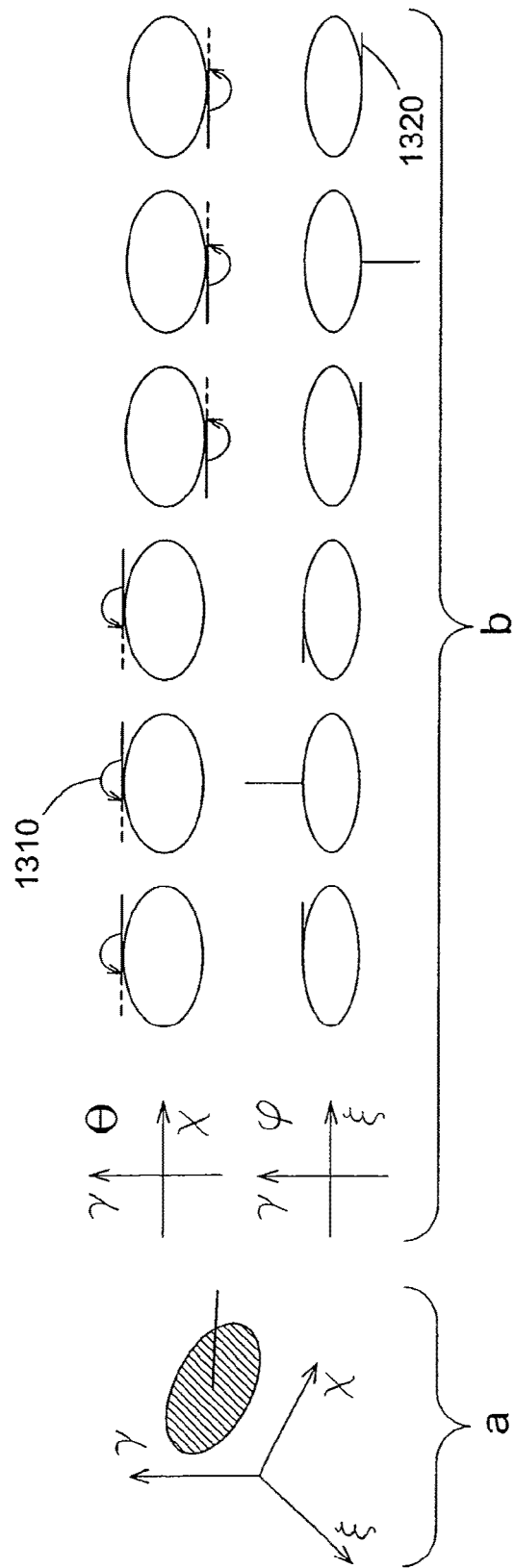
FIG. 13 illustrates the possible orientations of the cilium in relation to the axis of the chondrocyte in 3D according to an embodiment of the present invention.

FIG. 12C illustrates a variance of the orientation of the cilium with respect to the major axis of the chondrocyte in 3D according to an embodiment of the present invention. The y-axis represents the direction of the tibial axis measured in microns on the growth plate. The results show that the variance is non-random. For example, the values of the φ-angle (□) cluster mainly at 90°, 180°, 270° and 360°. Even though only 23 ciliated chondrocytes were analyzed, the primary cilium shows preferential values for the φ-angle. The values of the θ-angle (◇) for the observed primary cilium occur over the 360° range. The φ-angle varies usually between 0° and 180°. In one embodiment, information from the θ-angle relative to direction in which it points is added for better visualization in FIG. 13. In one aspect, that meant transforming the 0°-180° range into the 0°-360° range. Note that because the orientations at 0° and at 360° coincide, the 0° orientations are plotted at 360°.

FIGS. 13a and 13b illustrates the possible orientations of the cilium in relation to the axis of the chondrocyte in 3D according to an embodiment of the present invention. For either apical or basal axoneme there are shown through two views, each relative to the plane on which either the θ-angle or the φ-angle is measured. Note that this schematic is not to scale.

The diagram of the ciliated chondrocyte (a) in 3D within the RS is viewed in 2D (b) in two ways: projected onto the plane χγ on which the θ-angle is measured and within the plane ξγ on which the φ-angle is measured. FIG. 13b illustrates cilia 1310, 1320 with all the possible positionings of the primary cilium relative to its chondrocyte following the corresponding values in FIG. 12c. Indeed, the primary cilium projects apically into the ECM, the values of the θ-angle are restricted to the 0°-180° (first three of cilia 1310 from the left), and the possible values of the φ-angle are 0°, 90° and 180° (first three in cilia 1320 from the left). The basal projection of the primary cilium restricts the values of the θ-angle to the 180°-360° range (last three in cilia 1310) and the values of the φ-angle to 180°, 270° and 360° (last three in cilia 1320).

Figure 14:
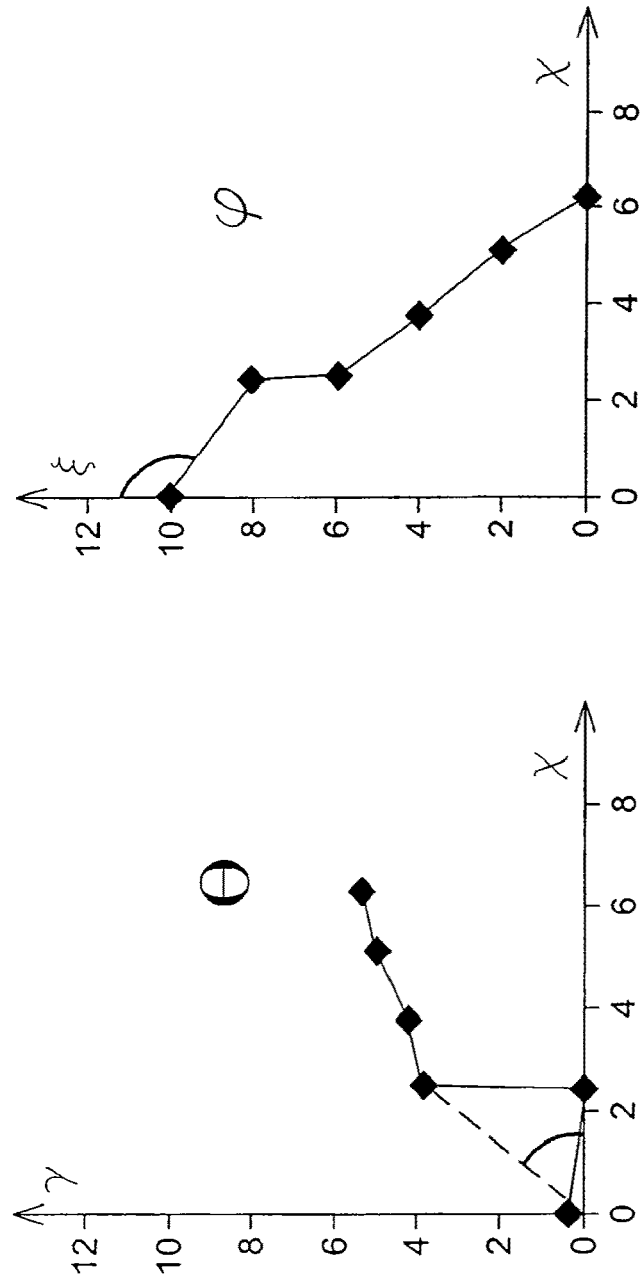
FIG. 14 illustrates variations of the $\theta$-angle and the $\phi$-angle along the length of a cilium according to an embodiment of the present invention.

FIG. 14 illustrates variations of the θ-angle and the φ-angle along the length of a cilium according to an embodiment of the present invention. As the segmentation that models the ciliary shape is not a straight line, there is a variation in the angles. The variations of the θ-angle along the projection of the cilium on the local reference χγ parallel to the xy-plane and of the φ-angle on the local reference γξ parallel to the yz-plane show deviation of the cilium from the linear shape. This means that the curvature varies along the cilium. The variation of the θ-angle (marked for the third point at left) along the projection of the cilium on the χγ-plane and of the φ-angle (marked for the first point at right) on the χξ-plane (right) shows lack of linearity through a segmentation, which constitutes corners rather than a straight line.

III. Possible Limitations

Three different kinds of factors (see Table I) potentially affect the reliability of any methodology that has as its goal the description of the primary cilium of a cell in three dimensional space.

TABLE I

Sources of potential errors.

| | | |
|---|---|---|
| First set | Fixation | structural preservation |
| | Multiphoton | Gaussian ellipse |
| | microscopy | photon shot noise |
| | | pixilation of structure |
| Second set | Image analysis | orientation of images |
| | | idealization of axonemal shape |
| | | idealization of chondrocytic shape |
| | | use of meaningful reference |
| | | angle between axoneme and centriole |
| Third set | Morphometry | intraobserver error |
| | | interobserver error |

A. Fixation and MPM

Specifically for growth plate cartilage, the first is a set of technical factors that includes: i) the choice of tissue's fixation method; and ii) the implications of the optical resolution of MPM.

Optimally, imaging should be conducted on non-fixed living tissue in vivo, but such imaging is unlikely for connective tissues in the near future. For this study, cold methanol was chosen as a precipitation-based fixative of the tissue because its fixation is rapid and because proteins are precipitated in place without cross-linking. Therefore, the potential for antibody penetration into the tissue and exposure of the primary antibody to the epitope of interest is maximized. As a tradeoff for rapidity and ability of the antibody to penetrate, this type of fixation sacrifices the quality of the morphological image. In fact, because methanol fixation is based on precipitation of proteins, methanol may deform the tissue, and in particular may deform chondrocytic shape and/or ciliary axonemal shape. Despite these potential limitations, the judgment was made that cold methanol was the fixative of choice given that the primary obstacle that needs to be overcome by pre-embedment immunocytochemistry is antibody penetration, which is particularly difficult in connective tissues with a dense extracellular matrix. Currently, we have no independent way to assess whether this method of fixation caused deformation of axonemes.

However, given the rapidity of fixation, it is unlikely that the ciliary axoneme radically changed position within the chondrocyte, as for example changing the side or octant of the cell from which it projected, in this study of ciliary orientation as opposed to a study of ciliary morphology. Thus a choice was made for a fixative that was consistent with obtaining the level of resolution that we sought in terms of measurement of the directionality of the projection of the axoneme, while in keeping with the realistic possibility of having the large molecular weight antibodies penetrate into the tissue for several hundred microns.

B. Image Analysis

The second set of factors is relevant primarily to the steps of the image analysis. For the consideration specifically of growth plate cartilage these include: i) compensating for orientation of the sample relative to the optical plane of the microscope, given that it is not possible to control the exact positioning of the specimen on the microscope's stage; ii) idealization of the shape of the ciliary axoneme; iii) idealization of chondrocytic shape in both two and three dimensions; iv) utilization of biologically meaningful reference axes with respect to which angles are measured (such as either the long axis of the chondrocyte or the direction of elongation of the bone); and v) consideration of the significance of the angle of the ciliary axoneme relative to the associated centriole.

A potential limitation of the study refers to the resolution of the MPM with respect to z-axis. In fact, the lens employed displays a "point" as a Gaussian ellipse with a lateral width of 0.5 and an axial length of 1.8 (Zipfel et al., 2003a). Therefore a point looks like an ellipse of approximately 0.5 μm in the x- and y-directions and of approximately 1.8 μm in the z-direction and the center of mass of the ellipse coincides with the original point. Therefore, the portion of the cilium within an optical section becomes blurry at the specific scale of the Gaussian ellipse. The orientation of the imaged cilium, and therefore the measurements of the θ and φ angles, is unaltered even though the cilium's appearance is blurry. Because the employed resolution associated a thickness of 1.8 μm to the plane of focus, it was impossible to know at which level within the plane of focus the end points of the cellular axis and of the cilium were located.

Therefore, an error is produced in the assessment of the cellular axis' and cilium's length in the z-direction. The error was at most equal to the sum of the thickness of the plane of focus, for each of the planes of focus relative to endpoints. The Gaussian ellipse also gave rise to a partial overlapping of the ciliary images, as shown in FIG. 6c. While the optical resolution does not lead to a change of orientation of the imaged cilium, it does change the error of measurement of orientation. The error in this measurement is determined by many imaging factors such as the photon shot noise, background in the image and any pixilation of the structure (Thompson et al., 2002) Lateral localization is typically in the 30 nm range for test bead systems and axial localization is expected to be four-fold reduced.

Approximating the cellular profile with an ellipse may be a limitation, as well as approximating the cilium length by the length of a segment. For example, the few wedged shaped cells were not included in the analysis. In one embodiment, this limitation can be avoided in the future by employing software such as Metamorph (Universal Co), which can automatically provide the x,y-coordinates of points on the cellular profile at a fixed distance, defined as an integer multiple of pixels, between successive points. Following this, the software Maple can construct so-called B-splines (Piegl and Tiller, 1997) to interpolate such sequence of points along the cellular profile. Such B-splines are defined as collections of polynomials that can be chosen to adapt as accurately as desired to the remaining points on the cellular profile.

C. Morphometry

The third set of factors relates directly to the reliability of the methodology specifically in relationship to repeatability, given the series of judgments required. Data demonstrating the degree of consistency of ciliary orientation in growth plates in general is not purported. Therefore, the consistency of output data performed by different individuals on the same data set is main interest. Our level of resolution of interest is ±30° on each of the xy- and yz-planes. Although at first pass this may seem a coarse level of resolution, it is one that is biologically meaningful if it could be measured consistently, given the panoply of biological variables involved.

TABLE II

| Image # | 5 | 6 | 7 | 8 |
|---|---|---|---|---|
| cilL | 7.50 | 9.20 | 10.10 | 9.10 |
| cilA | 65.63 | 65.43 | 74.32 | 73.35 |
| P1x | 99.60 | 99.40 | 98.70 | 100.20 |
| P1y | 55.00 | 54.30 | 55.20 | 56.40 |

TABLE II-continued

| Image # | 5 | 6 | 7 | 8 |
|---|---|---|---|---|
| P2x | 102.70 | 103.20 | 101.40 | 102.80 |
| P2y | 61.90 | 62.60 | 65.00 | 65.10 |
| Cx | 81.40 | 85.60 | 87.20 | 88.40 |
| Cy | 46.30 | 45.90 | 44.10 | 44.40 |
| MaL | 47.70 | 49.10 | 45.70 | 45.50 |
| MaA | 159.13 | 159.13 | 159.14 | 159.13 |
| maL | 37.20 | 38.20 | 37.10 | 35.40 |

Table 1 shows cell and cilia measurements for each of the images #5 through #8 on which cell #1 and its cilium both appear according to an embodiment of the present invention. Lengths are measured in microns and angles in degrees. The values are as follows: cilium length (cilL); cilium angle (cilA) with respect to the x-axis; planar coordinates of endpoints P1 (P1x, P1y) and P2 (P2x, P2y) of the segment modeling the cilium; planar coordinates for the center of the ellipse that models the cell (Cx, Cy); the length of the ellipse's major axis (MaL); ellipse's major axis angle (MaL) with respect to the x-axis; and the length of the ellipse's minor axis (maL).

The robustness of the morphometric method 510 was analyzed through consideration of intraobserver and interobserver errors. The magnitude of these errors was assessed for each entity that appears listed in the first column of Table II on the images of five chondrocytes. The calculation of errors concerning the data relative to the cilium length on image #5 is presented in Table III).

TABLE III

| Meas # | Obs 1 | Obs 2 | Abs(diff) |
|---|---|---|---|
| 1 | 7.53 | 7.51 | 0.02 |
| 2 | 7.56 | 7.52 | 0.04 |
| 3 | 7.55 | 7.51 | 0.04 |
| 4 | 7.53 | 7.50 | 0.03 |
| 5 | 7.50 | 7.52 | 0.02 |
| 6 | 7.51 | 7.52 | 0.01 |
| 7 | 7.51 | 7.51 | 0.00 |
| 8 | 7.54 | 7.51 | 0.03 |
| 9 | 7.51 | 7.48 | 0.03 |
| 10 | 7.54 | 7.51 | 0.03 |
| 11 | 7.52 | 7.51 | 0.01 |
| 12 | 7.52 | 7.50 | 0.02 |
| 13 | 7.54 | 7.52 | 0.02 |
| 14 | 7.51 | 7.48 | 0.03 |
| 15 | 7.52 | 7.49 | 0.03 |
| 16 | 7.53 | 7.50 | 0.03 |
| 17 | 7.53 | 7.53 | 0.00 |
| min | 7.50 | 7.48 | 0.00 |
| max | 7.56 | 7.53 | 0.04 |
| mean | 7.526 | 7.507 | 0.023 |
| stdev | 0.020 | 0.019 | 0.012 |

For the purpose of computing intraobserver and interobserver errors, all the entities listed in Table I were measured 17 times on five chondrocytes with cilium by two observers. For the cilium length on scan #5, each of the measurements numbered (Meas #) were taken by observer 1 (Obs 1) and observer 2 (Obs 2) independently. The absolute value of each difference of paired measurements (AbsD) is listed. Minimum (min), maximum (max), mean, standard deviation (st dev) were computed for measurements of observer 1 and 2 separately.

To assess the magnitude of the intraobserver error, seventeen iterations afford sufficient data to consider their distribution. Because the distribution is free of outliers and marked skewness, the t-procedures can be applied to compute the power of the mean to detect actual ciliary length. Because the precision with which we measured lengths equals ±0.005 µm, the probability of the mean to provide the actual length results equal to 0.90 for observer 1 and 0.70 for observer 2. If either mean separately does not reflect the actual length, the error equals at most (max−min)/min, that is 0.06/7.50 for observer 1 and 0.05/7.48 for observer 2. The intraobserver error for a unique measurement was found at most equal to 1%.

In the analysis of the interobserver error between two independent observers, neither the mean of the differences of corresponding measurements nor the difference of the means provides a strong power for the actual prediction of two length measurements, one length by observer 1 and one length by observer 2. In fact, the highest power is provided by the mean of the differences of corresponding measurements, on the order of 55%. This is because the means of each of the two data sets are very close in value to each other while the ranges of each of the two data sets differ relatively more from each other. Nevertheless, the error of a unique measurement is at most equal to either of two values: the difference of the two largest measurements (0.07) divided by the smallest length (7.48) if the measurements of the two sets are considered paired; or to the largest measurements' difference (0.08) divided by the smallest length (7.48) if the measurements of the two sets are considered unpaired. In either case, the ratios equal 1%. The interobserver error for a unique measurement on five chondrocytes was found at most equal to 1%. On the basis of the small magnitude of the above-analyzed morphometric errors, performance of one measurement by a single observer was deemed appropriate.

TABLE IV

| CeLp (µm) | CeE | CiL (µm) | θ (deg) | φ (deg) | NuCe |
|---|---|---|---|---|---|
| 421.03 | 0.75 | 6.44 | 302.31 | 39.60 | 7 |
| 288.29 | 0.49 | 4.97 | 101.35 | 147.37 | 9 |
| 283.01 | 0.94 | 5.21 | 122.63 | 235.11 | 2 |
| 247.00 | 0.65 | 11.46 | 275.42 | 354.58 | 4 |
| 243.97 | 0.72 | 11.12 | 302.40 | 57.02 | 8 |
| 234.06 | 0.52 | 12.82 | 32.98 | 48.30 | 5 |
| 185.29 | 0.86 | 4.56 | 41.70 | 327.69 | 6 |
| 155.99 | 0.86 | 7.56 | 214.89 | 327.60 | 3 |
| 76.79 | 0.39 | 6.24 | 102.21 | 168.65 | 1 |

Observations of chondrocytic shape are confirmed by calculations of the degree of eccentricity on the multiphoton images, as shown in Table IV. In order of decreasing cellular longitudinal position (CeLp), cellular eccentricity (CeE), ciliary length (CiL), and ciliary angles (θ) and (φ) with respect to the cell orientation are listed for each numbered cell (NuCe) in Table IV.

Accordingly, multiphoton microscopy, paired with the new ciliary θφ-method, allowed assessment of the three-dimensional orientation of primary cilia associated with chondrocytes of the growth plate. Strengths of this modeling method are its accuracy and flexibility. Its accuracy derives from small intraobserver and interobserver errors. Accuracy further derives from the property of mathematics to describe complex biological systems and from the thorough consideration of all details of the application. The flexibility comes from the lack of pre-prepared tools that might limit the rendering of the model. It is the flexibility of the modeling method that will allow application to the study of the primary cilium of cells in connective tissues of different composition and micro-geometries, such as tendon, annulus fibrosus, meniscus, ligament, cartilage, or bone.

In conclusion, because the potential experimental and morphometric errors (see Table I for a summary) discussed have a small effect on the ciliary orientation, the results constitute a highly reproducible outcome at a level of resolution that permits an experimentally rapid assessment of the orientation of the axoneme of primary cilia associated with cells of the growth plate.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, along with a processor which can execute instructions on the computer readable medium, and may be present on or within different computational apparatuses within a system or network.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

BIBLIOGRAPHY

Badano, J. L., Teslovich, T. M., Katsanis, N., 2005. The centrosome in human genetic disease. Nat. Rev. Gen. 6, 194-205.

Beertsen, W., Everts, V., Houtkooper, J. M., 1975. Frequency of occurrence and position of cilia in fibroblasts of the periodontal ligament of the mouse incisor. Cell Tissue Res. 163, 415-431.

Bray, R. C., Salo, P. T., Lo, I. K., Ackermann, P., Rattner, J. B., Hart, D. A., 2005. Normal ligament structure, physiology and function. Sports Med. Arthr. Rev. 13, 127-135.

Breur, G. J., VanEnkevort, B. A., Farnum, C. E., Wilsman, N. J., 1991. Linear relationship between the volume of hypertrophic chondrocytes and the rate of longitudinal bone growth in growth plates. J. Orthop. Res. 9, 348-359.

Buceta, J., Ibanes, M., Rasskin-Gutman, D., Okada, Y., Hirokawa, N., Izpisua-Belmonte, J. C., 2005. Nodal cilia dynamics and the specification of the left/right axis in early vertebrate embryo development. Biophys. J. 89, 2199-2209.

Buckwalter, J. A., Mower, D., Schafer, J., Ungar, R., Ginsberg, B., Moore, K., 1985. Growth-plate chondrocyte profiles and their orientation. J. Bone Joint Surg. 67-A, 942-955.

Buckwalter, J. A., Mower, D., Ungar, R., Schaeffer, J., Ginsberg, G., 1986. Morphometric analysis of chondrocyte hypertrophy. J. Bone Jt. Surg. 68-A, 243.

Chi, S. S., Rattner, J. B., Malyas, J. R., 2004. Communication between paired chondrocytes in the superficial zone of articular cartilage. J. Anat. 205, 363-370.

Corbit, K. C., Aanstad, P., Singla, V., Norman, A. R., Stainier, D. Y., Reiter, J. F., 2005. Vertebrate smoothened functions at the primary cilium. Nature 437, 1018-1021.

Cox, R. W., Peacock, M. A., 1977. The fine structure of developing elastic cartilage. J. Anat. 123, 283-296.

Cruz-Orive, L. M., Hunziker, E. B., 1986. Stereology for anisotropic cells: application to growth cartilage. J. Microsc. 143, 47-80.

Davenport, J. R., Yoder, B. K., 2005. An incredible decade for the primary cilium: a look at a once-forgotten organelle. Am. J. Physiol. Renal. Physiol. 289, 1159-1169.

Eliceiri, K. W., Rueden, C., 2005. Tools for visualizing multidimensional images from living specimens. J. Photochem. Photobiol. 81, 1116-1122.

Farnum, C. E., Wilsman, N. J., 2002. The Growth Plate, in: Shapiro, I. M., Boyan, B. D., Anderson, H. C. (Eds.), Chondrocyte kinetics in the growth plate. IOS Press, Washington D.C., Vol. 54, pp. 245-257.

Farnum, C. E., 1994. Differential growth rates of long bones, in: Hall, B. (Ed.), Bone: Development and Differentiation. CRC Press Inc., Boca Raton, Vol. 8, pp. 193-222.

Farnum, C. E., Lenox, M., Zipfel, W., Horton, W., and Williams, R., 2006. In vivo delivery of fluoresceinated dextrans to the murine growth plate: imaging of three vascular routes by multiphoton microscopy. Anat. Rec. 288A, 91-103.

Farnum, C. E., Turgai, J., Wilsman, N. J., 1990. Visualization of living terminal hypertrophic chondrocytes of growth plate cartilage in situ by differential interference contrast microscopy and time-lapse cinematography. J. Orthop. Res. 8, 750-763.

Farnum, C. E., Wilsman, N. J., 1983. Pericellular matrix of growth plate chondrocytes: A study using post-fixation with osmium-ferrocyanide. J. Histochem. Cytochem. 31, 765-775.

Farnum, C. E., Wilsman, N. J., 1987. Morphologic stages of the terminal hypertrophic chondrocyte of growth plate cartilage. Anat. Rec. 219, 221-232.

Farnum, C. E., Wilsman, N. J., 2001. Converting a differentiation cascade into longitudinal growth: stereology and analysis of transgenic animals as tools for understanding growth plate function. Curr. Opin. Orth. 12, 428-433.

Farnum, C. E., Wilsman, N. J., 2002. Chondrocyte kinetics in the growth plate. In: The Growth Plate, I. M. Shapiro, H. C. Anderson, B. C. Boyan (Eds) IOS Press, Amsterdam, The Netherlands, pp. 245-257.

Federman, M., Nichols, G., 1974. Bone cell cilia: Vestigal or functional organelles? Calc. Tissue Res. 17, 81-85.

Fischer, E., Legue, E., Doyen, A., Nato, F., Nicolas, J., Torres, V., Yaniv, M., Pontoglio, M., 2006. Defective plan cell polarity in polycystic kidney disease. Nat. Genet. 38, 21-23.

Garant P. R., Szabo, G., and Nalbandian, J., 1968. The fine structure of the mouse odontoblast. Archs. Oral Biol. 13, 857-876.

Geerts, A., Bouwens, L., Wisse, E., 1990. Ultrastructure and function of hepatic fat-storing and pit cells. J. Electr. Micr. Tech. 14, 247-256.

Germino, G. G., 2005. Linking cilia to Wnts. Nat. Genet. 37, 455-457.

Goldstein, B., Takeshita, H., Mizumoto, K., Sawa, H., 2006. Wnt signals can function as positional cues in establishing cell polarity. Dev. Cell 10, 391-396.

Hirokawa, N., Tanaka, Y., Okada, Y., Takeda, S., 2006. Nodal flow and the generation of left-right asymmetry. Cell 125, 33-45.

Huangfu, D., Anderson, K. V., 2005. Cilia and hedgehog responsiveness in the mouse. Proc. Nat. Acad. Sc. USA 102, 11325-11330.

Hunziker, E. B., Schenk, R. K., 1989. Physiological mechanisms adopted by chondrocytes in regulating longitudinal bone growth in rats. J. Physiol. 414, 55-71.

Hunziker, E. B., Herrmann, W., Schenck, R. K., 1983. Ruthenium hexamine trichloride (RHT)-mediated interaction between plasmalemmal components and pericellular matrix proteoglycans is responsible for the preservation of chondrocytic plasma membranes in situ during cartilage fixation. J. Histochem. Cytochem. 31, 717-727.

Hunziker, E. B., Schenk, R. K., Cruz-Orive, L. M., 1987. Quantitation of chondrocyte performance in growth plate cartilage. J. Bone Joint. Surg. Am. 69, 162-173.

Kloppenburg, P., Zipfel, W. R., Webb, W. W., Harris-Warrick, R. M., 2000. Highly localized Ca(2+) accumulation revealed by multiphoton microscopy in an identified motoneuron and its modulation by dopamine. J. Neurosc. 20, 2523-2533.

Kutsuna, N., Hasezawa, S., 2005. Morphometrical study of plant vacuolar dynamics in single cells using three-dimensional reconstruction from optical sections. Microsc. Res. Tech. 68, 296-306.

Le Graverand, M.-P. H., Ou, Y., Schield-Yee, T., Barclay, L., Hart, D., Natsume, T., Rattner, J. B., 2001. The cells of the rabbit meniscus: their arrangement, interrelationship, morphological variations and cytoarchitecture. J. Anat. 198, 525-535.

Liu A., Wang, B., Niswander, L. A., 2005. Mouse intraflageller transport proteins regulate both the activator and repressor functions of Gli factors. Development 132, 3103-3111.

Nonaka, S., Yoshiba, S., Watanabe, D., Ikeuchi, S., Goto, T., Marshal, W. F., Hamada, H., 2005. De novo formation of left-right asymmetry by posterior tilt of nodal cilia. PLoS Biol. 3, 1-6.

Okada, Y., Takeda, S., Tankada, Y., Izpisua-Belmonte, J. C., Hirokawa, N., 2005. Mechanism of nodal flow: a conserved symmetry breaking event in left-right axis determination. Cell 121, 633-644.

Olsen, B., 2005. From the editor's desk. Matrix Biol. 24, 449-450.

Pan, J., Wang, Q., Snell, W. J., 2005. Cilium-generated signaling and cilia-related disorders. Lab. Invest. 85, 452-463.

Pazour, G. J., Witman, G. B., 2003. The vertebrate primary cilium is a sensory organelle. Current Opin. Cell Biol. 15, 105-110.

Piegl, L., Tiller, W., 1997. The NURBS book. Springer-Verlag, Berlin, Germany.

Piperno, G., Fuller, M. T., 1985. Monoclonal antibodies specific for an acetylated form of alpha-tubulin recognize the antigen in cilia and flagella from a variety of organisms. J. Cell Biol. 101, 2085-2094.

Poole, C. A., Flint, M. H., Beaumont, B. W., 1985. Analysis of the morphology and function of primary cilia in connective tissues: A cellular cybernetic probe? Cell Motil. 5, 175-193.

Poole, C. A., Jensen, C. G., Snyder, J. A., Gray, C. G., Hermanutz, V. L., Wheatley, D. N., 1997. Confocal analysis of primary cilia structure and colocalization with the golgi apparatus in chondrocytes and aortic smooth muscle cells. Cell Biol. Int. 21, 483-494.

Poole, C. A., Zhang, Z. J., Ross, J. M., 2001. The differential distribution of acetylated and detyrosinated alpha-tubulin in the microtubular cytoskeleton and primary cilia of hyaline cartilage chondrocytes. J. Anat. 199, 393-405.

Quarles L. D., 2005. Preliminary evidence that PKD1 function as a mechano-sensor in bone. 35th Intern. Sun Valley Workshop Skel. Tissue Biol., 61-62.

Quarmby, L. M., Parker, J. D. K., 2005. Cilia and the cell cycle? J. Cell Biol. 169, 707-710.

Schneider, L., Clement, C. A., Teilmann, S. C., Pazour, G. J., Hoffmann, E. K., Satir, P., Christensen, S. T., 2005. PDGFRαα signaling is regulated through the primary cilium in fibroblast. Curr. Biol. 15, 1861-1866.

Tanaka, Y., Okada, Y., Hirokawa, N., 2005. FGF-induced vesicular release of Sonic hedgehog and retinoic acid in leftward nodal flow is critical for left-right determination. Nature 435, 172-177.

Tonna E. A., Lampen N. M., 1972. Electron microscopy of aging skeletal cells. I. Centrioles and solitary cilia. J. Gerontal. 27, 316-324.

Ward, C. J., Yuan, D., Masyuk, T. V., Wang, X., Punyashthiti, R., Whelan, S., Bacallao, R., Torra, R., LaRusso, N. F., Torres, V. E., Harris, P. C., 2003. Cellular and subcellular localization of the ARPKD protein; fibrocystin is expressed on primary cilia. Human Molec. Genet. 12, 2703-2710.

Wheatley, D. N., Wang, A. M., Strugnell, G. E., 1996. Expression of primary cilia in mammalian cells. Cell Biol. Int. 20, 73-81.

Whitfield, J. F., 2003. Primary cilium-is it an osteocyte's strain-sensing flowmeter? J. Cell. Biochem. 89, 233-237.

Williams, R. M., Zipfeld, W. R., Webb, W. W., 2005. Interpreting second harmonic generation images of collagen I fibrils. Bioph. J. 88, 1377-1386.

Wilsman, N. J., 1978. Cilia of adult canine articular chondrocytes. J. Ultrastruct. Res. 64, 270-281.

Wilsman, N. J., Farnum, C. E., 1986. Three dimensional orientation of chondrocytic cilia in adult articular cartilage. Proc. 32nd Orthop. Res. Soc., New Orleans, 486.

Wilsman, N. J., Farnum, C. E., Breur, G. J., Leiferman, E. M., 1993. Spatial arrangement of growth plate chondrocytes and a proposed functional unit as represented by an "average equivalent column". Proc. 39th Orthop. Res. Soc., San Francisco, 694.

Vogel, G., 2005. Betting on cilia. Science 310, 216-218.

Zimmerman, K. W., 1898. Beitrage zur kenntniss einiger drusen und epithelien. Entwicklungsmech 52, 552-706.

Zipfel, W. R., Williams, R. M., Webb, W. W., 2003a. Nonlinear magic: multiphoton microscopy in biosciences. Nat. Biotechnol. 21, 1369-1377.

Zipfel, W. R., Williams, R. M., Christie, R., Nikitin, A. Y., Hyman, B. T., Webb, W. W., 2003b. Live tissue intrinsic emission microscopy using multiphoton-excited native fluorescence and second harmonic generation. Proc. Natl. Acad. Sci. USA, 100, 7075-7080.

What is claimed is:

1. A method for determining an orientation of a cilium, the method comprising:
   receiving three-dimensional imaging data of tissue containing a first cell and a first cilium projecting from the first cell;
   choosing a coordinate system for the imaging data;
   determining, by a processor, a three-dimensional spatial profile of the first cell from the imaging data;
   identifying an axis of the first cell from the spatial profile;
   determining, by a processor, from the imaging data, a line segment corresponding to at least part of the first cilium; and
   calculating, by a processor, two angles defined between the axis of the first cell and the line segment of the first cilium.

2. The method of claim 1 wherein the axis is a longest segment from one edge of the spatial profile to another edge of the spatial profile.

3. The method of claim 1 wherein the three-dimensional imaging data comprises a stack of two-dimensional images taken at varying depths within the tissue.

4. The method of claim 3, further comprising:
   marking cells that appear with a corresponding cilium on at least a predetermined number of consecutive images as visible;
   for additional cells visible in the imaging data, repeating determining a three-dimensional spatial profile, identifying an axis, determining a line segment corresponding to at least part of the first cilium; and calculating the two angles defined between the axis of the visible cell and the line segment of the first cilium.

5. The method of claim 3 wherein determining a three-dimensional spatial profile comprises:
   determining a plurality of two-dimensional profiles of the first cell, one two-dimensional profile for each image of the stack on which the first cell is visible; and
   combining the two-dimensional profiles.

6. The method of claim 5, further comprising:
   identifying a two-dimensional axis for each two-dimensional profile; and
   determining a corresponding two-dimensional line segment for a visible part of the first cilium projecting from a respective two-dimensional profile,
   wherein calculating the two angles defined between the axis of the first cell and the line segment of the first cilium comprises:
   for each two-dimensional profile, computing a planar angle between the two-dimensional axis and the corresponding two-dimensional line segment
   calculating one of the two angles by taking an average of the planar angles.

7. The method of claim 3 wherein the functional profile is an ellipsoid, and wherein determining a three-dimensional spatial profile comprises:
   measuring a major axis length, a major axis angle, and a minor axis length of an ellipse from each two-dimensional image on which the first cell is visible;
   calculating an equation of each ellipse using an eccentricity of the ellipse; and
   determining the ellipsoid from a fit to the ellipses.

8. The method of claim 7, wherein calculating a second of the two angles comprises:
   identifying a vector that passes through any two subsequent centroids of segments that model the first cilium on respective two-dimensional images; and
   computing the angle between the vector and an axis of the ellipsoid.

9. The method of claim 1 wherein the spatial profile is an interpolated spline of a set of pixels defining an outer edge of the cell.

10. The method of claim 1 wherein determining a line segment corresponding to at least part of the first cilium comprises fitting a curve to data points corresponding to the fluorescent detail of the first cilium; and
    wherein calculating the two angles comprises calculating a continuous spectrum of angles between the curve and the axis.

11. The method of claim 1, further comprising:
    rotating the coordinate system to align with a tissue growth orientation.

12. The method of claim 1, further comprising:
    repeating determining a line segment corresponding to at least part of additional cilia projecting from the first cell, and calculating the two angles defined between the axis and the line segment of each cilium.

13. A computer readable medium having a plurality of instructions adapted to execute a processor to perform an operation for determining an orientation of a cilium, the operation comprising:
- receiving three-dimensional imaging data of tissue containing a first cell and a first cilium projecting from the first cell;
- choosing a coordinate system for the imaging data;
- determining a three-dimensional spatial profile of the first cell from the imaging data;
- identifying an axis of the first cell from the spatial profile;
- determining, from the imaging data, a line segment corresponding to at least part of the first cilium; and
- calculating two angles defined between the axis of the first cell and the line segment of the first cilium.

14. The computer storage medium of claim 13 wherein the three-dimensional imaging data comprises a stack of two-dimensional images taken at varying depths within the tissue, and wherein determining a three-dimensional spatial profile comprises:
- determining a plurality of two-dimensional profiles of the first cell, one two-dimensional profile for each image of the stack on which the first cell is visible; and
- combining the two-dimensional profiles.

15. The computer storage medium of claim 14 wherein the operation further comprises:
- identifying a two-dimensional axis for each two-dimensional profile; and
- determining a corresponding two-dimensional line segment for a visible part of the first cilium projecting from a respective two-dimensional profile,
- wherein calculating the two angles defined between the axis of the first cell and the line segment of the first cilium comprises:
  - for each two-dimensional profile, computing a planar angle between the two-dimensional axis and the corresponding two-dimensional line segment
  - calculating one of the two angles by taking an average of the planar angles.

16. The computer storage medium of claim 13 wherein determining a line segment corresponding to at least part of the first cilium comprises fitting a curve to data points corresponding to the fluorescent detail of the first cilium; and
- wherein calculating the two angles comprises calculating a continuous spectrum of angles between the curve and the axis.

17. A method of determining an orientation of cilia for a plurality of cells in a sample of tissue, the method comprising:
- receiving three-dimensional imaging data of tissue containing cells and a respective cilium projecting from each cell;
- determining, by a processor, a three-dimensional spatial profile of each cell from the imaging data;
- identifying an axis of each cell from a respective spatial profile;
- determining, by a processor, from the imaging data, a line segment corresponding to at least part of each cilium; and
- for each cell, calculating, by a processor, two angles defined between the axis of the cell and the line segment of the respective cilium.

18. The method of claim 17, further comprising:
plotting a variance in at least one of the two angles of the cilia to determine a preferred orientation of the cilia.

19. The method of claim 18, further comprising:
plotting the variance in at least one of the two angles versus a direction of growth of the tissue.

20. The method of claim 17 wherein the cells of the tissue is selected from the group consisting of osteoblast, chondrocyte of articular, chondrocyte of elastic, osteocyte, odontoblast, ligament fibroblast, meniscal fibroblast, periodontal cell, and adipocyte.

21. The method of claim 17 wherein the three-dimensional imaging data is obtained by:
- visualizing the cells using antibodies to acyl-alpha-tubulin; and
- using multiphoton microscopy for optical sectioning of the sample.

* * * * *